US012617205B2

(12) United States Patent
Tsuji et al.

(10) Patent No.: US 12,617,205 B2
(45) Date of Patent: May 5, 2026

(54) LIQUID EJECTION HEAD AND MANUFACTURING METHOD OF LIQUID EJECTION HEAD

(71) Applicant: CANON KABUSHIKI KAISHA, Tokyo (JP)

(72) Inventors: Tomoki Tsuji, Kanagawa (JP); Shuzo Iwanaga, Kanagawa (JP); Hiromasa Amma, Kanagawa (JP); Shingo Okushima, Kanagawa (JP); Tatsurou Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/539,728

(22) Filed: Dec. 14, 2023

(65) Prior Publication Data

US 2024/0217237 A1 Jul. 4, 2024

(30) Foreign Application Priority Data

Dec. 28, 2022 (JP) ................................ 2022-211333

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/164* (2013.01)

(58) Field of Classification Search
CPC .... B41J 2/1404; B41J 2/1433; B41J 2/14024; B41J 2/162; B41J 2/1623; B41J 2/1642; B41J 2/14145; B41J 2/145; B41J 2002/14362; B41J 2202/19; Y10T 29/49401
See application file for complete search history.

(56) References Cited

U.S. PATENT DOCUMENTS 5,754,202 A * 5/1998 Sekiya .................. B41J 2/1645 347/47
6,520,626 B1 * 2/2003 Murakami ............ B41J 2/1631 347/61

(Continued)

FOREIGN PATENT DOCUMENTS

JP 4-234665 A 8/1992
JP 2006-334910 A 12/2006

OTHER PUBLICATIONS

Machine Translation of JP-H04234665-A Retrieved from Espacenet Sep. 27, 2025 (Year: 2025).*
Mori et al., U.S. Appl. No. 18/397,115, filed Dec. 27, 2023.

*Primary Examiner* — John P Zimmermann
(74) *Attorney, Agent, or Firm* — Venable LLP

(57) ABSTRACT

The liquid ejection head including a first liquid ejection module and a second liquid ejection module, each including a printing element substrate having an ejection surface on which a plurality of ejection port rows ejecting liquid is formed and a protection member having an opening corresponding to the ejection port row, and the ejection surface and the protection member are bonded to each other with a bonding adhesive, a space between the first liquid ejection module and the second liquid ejection module is sealed with a sealing member, and on a surface on the opposite side of a surface bonded to the ejection surface with the bonding adhesive, at least one side of the protection member, which is in close proximity to the sealing member, is made water repellent.

10 Claims, 21 Drawing Sheets

(56) References Cited

U.S. PATENT DOCUMENTS

| | | | | |
|---|---|---|---|---|
| 8,197,048 | B2 * | 6/2012 | Yamanaka | B41J 2/14274 347/70 |
| 2008/0062218 | A1 * | 3/2008 | Yanagisawa | B41J 29/393 347/19 |
| 2017/0197439 | A1 * | 7/2017 | Okushima | B41J 2/175 |
| 2018/0162130 | A1 * | 6/2018 | Moriya | B41J 2/14024 |
| 2020/0276812 | A1 * | 9/2020 | Okushima | B41J 2/1404 |
| 2022/0009230 | A1 * | 1/2022 | Furuzawa | B41J 2/14201 |
| 2023/0311507 | A1 * | 10/2023 | Tachibana | B41J 2/14024 347/54 |
| 2024/0217234 | A1 * | 7/2024 | Kodoi | B41J 2/1404 |

* cited by examiner

LIQUID EJECTION HEAD AND MANUFACTURING METHOD OF LIQUID EJECTION HEAD

BACKGROUND OF THE INVENTION

Field of the Invention

The present disclosure relates to a liquid ejection head and a manufacturing method of a liquid ejection head.

Description of the Related Art

A line liquid ejection apparatus is known, which performs fast printing using a liquid ejection head comprising a liquid ejection unit corresponding to the width of a printing medium, in which a plurality of printing element substrates is arrayed. In a case where continuous printing is performed in one pass while conveying a plurality of printing media continuously or intermittently, there is a possibility that the printing medium being conveyed floats and comes into contact with the printing element substrate, and therefore, the liquid ejection head is damaged.

As a method of solving the above-described problem, as in Japanese Patent Laid-Open No. 2006-334910 (in the following, referred to as Literature 1) and Japanese Patent Laid-Open No. H04-234665 (in the following, referred to as Literature 2), a configuration has been disclosed in which a protection member made of resin or metal is bonded to an ejection port formation surface.

Incidentally, for the liquid ejection head, a configuration is known in which the gap between the printing element substrate and the peripheral member of the printing element is sealed with a sealing member in order to improve air-tightness at the time of cap suction. It is also necessary to cause the sealing member to flow into a minute space, and therefore, a material whose fluidity is high is used as the material of the sealing member.

However, with the configuration as in Literature 1 and Literature 2, there is a possibility that the sealing member climbs up onto the protection member and sticks to the surface. In a case where the sealing member sticks to the surface of the protection member, there is a possibility that the sealing member having stuck to the protection member is scraped off at the time of the wiping operation and enters the inside of the ejection port, causing non-ejection.

SUMMARY OF THE INVENTION

The liquid ejection head of the present disclosure includes a first liquid ejection module and a second liquid ejection module, each comprising a printing element substrate having an ejection surface on which an ejection port row ejecting liquid is formed and a protection member having an opening corresponding to the ejection port row, wherein the ejection surface and the protection member are bonded to each other with a bonding adhesive, a space between the first liquid ejection module and the second liquid ejection module is sealed with a sealing member, and on a surface on the opposite side of a surface bonded to the ejection surface with the bonding adhesive, at least one side of the protection member, which is in close proximity to the sealing member, is made water repellent.

Further features of the present invention will become apparent from the following description of exemplary embodiments with reference to the attached drawings.

DESCRIPTION OF THE EMBODIMENTS

Hereinafter, examples of embodiments of the present disclosure will be described with reference to the drawings. However, it is to be understood that the following description is not intended to limit the scope of the present disclosure. As one example, while a thermal system which generates bubbles using a heating element to eject a liquid is adopted in the present embodiments, the present disclosure can also be applied to liquid ejection heads adopting a piezoelectric system and other various liquid ejection systems.

While the present embodiment is an ink jet printing apparatus (printing apparatus) in an aspect in which liquid such as ink is caused to circulate between a tank and a liquid ejection head, but another aspect may also be acceptable. For example, an aspect may also be acceptable in which two tanks are provided on the upstream side and the downstream side of a liquid ejection head and ink within a pressure chamber is caused to flow by causing ink to flow from one tank to another without circulating ink.

Further, the present embodiment is a so-called line head having the length corresponding to the width of a printing medium, but it is also possible to apply the present disclosure to a so-called serial liquid ejection head that performs printing while scanning a printing medium. As the serial liquid ejection head, for example, there is a configuration in which one printing element substrate for black ink and one printing element substrate for color ink are mounted. The liquid ejection head of the present disclosure is not limited to this and an aspect may also be acceptable in which a short line head whose length is less than the width of a printing medium is created, in which several printing element substrates are arranged so that the ejection ports overlap in the ejection port row direction, and the line head is caused to scan a printing medium.

Description of Basic Configuration of the Present Disclosure (Description of Ink Jet Printing Apparatus)

Figure 1:
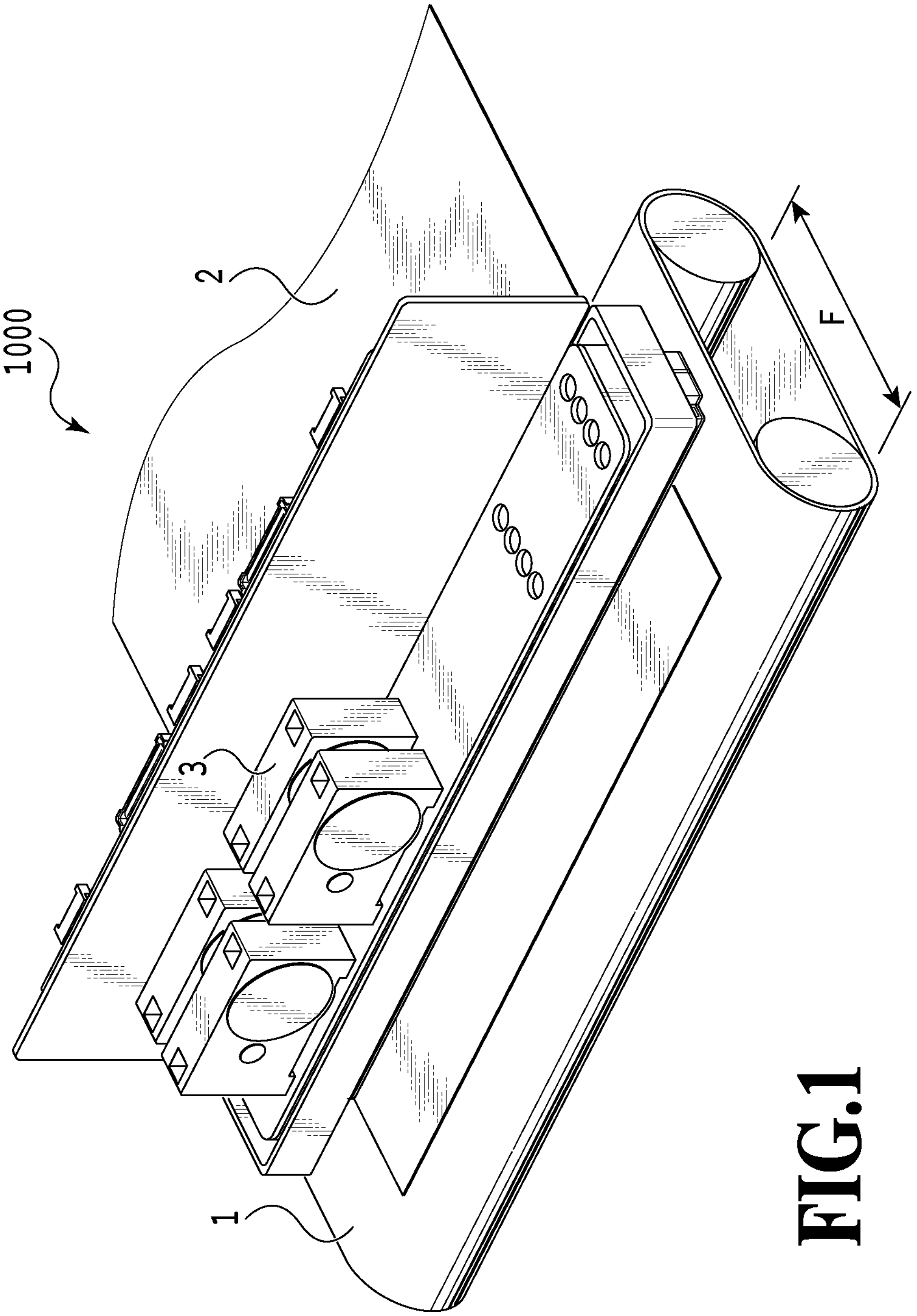
FIG. 1 is a schematic configuration diagram of an ink jet printing apparatus according to the present disclosure.

FIG. 1 shows a schematic configuration of an apparatus that ejects liquid, particularly, an inkjet printing apparatus 1000 (hereinafter, also referred to as a printing apparatus) that performs printing by ejecting ink according to the present disclosure. The printing apparatus 1000 is a line printing apparatus comprising a conveyance unit 1 configured to convey a printing medium 2 and a line liquid ejection head 3 arranged substantially perpendicular to the conveyance direction of a printing medium and performing continuous printing in one pass while conveying a plurality of the printing media 2 continuously or intermittently. The printing medium 2 is not limited to cut paper and may be continuous roll paper. The liquid ejection head 3 is capable of full-color printing by CMYK inks (cyan, magenta, yellow, black). Further, to the liquid ejection head 3, a liquid supply unit, which is a supply path, configured to supply liquid to the liquid ejection head, a main tank, and a buffer tank (see FIG. 2) are connected fluidly as will be described later. Furthermore, to the liquid ejection head 3, an electric control unit configured to transmit electric power and an ejection control signal to the liquid ejection head 3 is connected electrically. A liquid path and an electric signal path within the liquid ejection head 3 will be described later.

(Description of Circulation Path)

Figure 2:
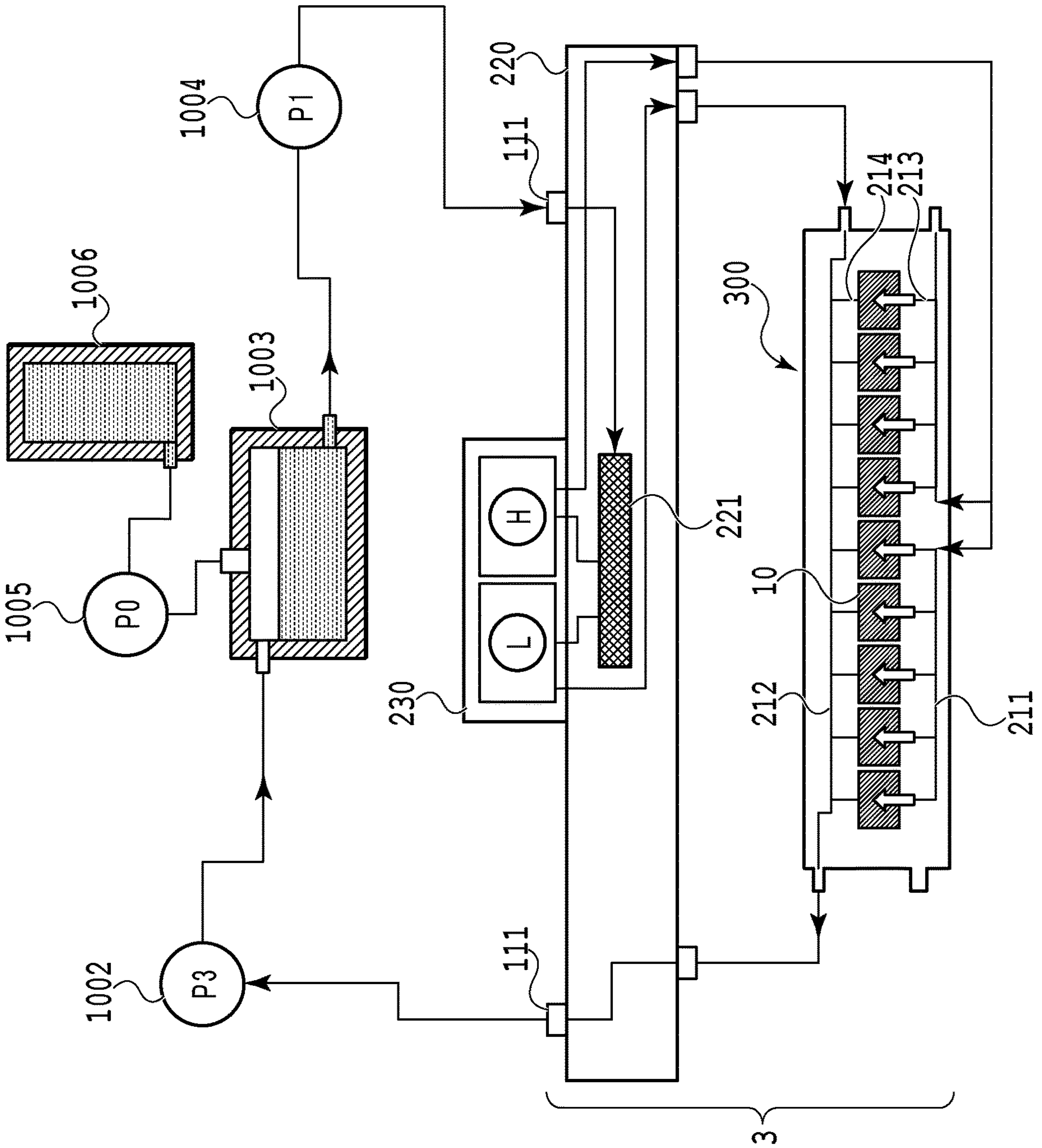
FIG. 2 is a schematic diagram of a liquid circulation path of the ink jet printing apparatus according to the present disclosure.

FIG. 2 is a schematic diagram showing a circulation path that is applied to the printing apparatus of the present embodiment and in which the liquid ejection head 3 is connected fluidly to a first circulation pump 1002, a buffer tank 1003 and the like. In FIG. 2, for simplification of description, only the path through which ink of one color among CMYK inks flows is shown. The buffer tank 1003 as a sub tank, which is connected with a main tank 1006 has an atmosphere communication port (not shown schematically) causing the inside and the outside of the tank to communicate with each other and it is possible to discharge air bubbles in ink to the outside. The buffer tank 1003 is also connected with a replenishment pump 1005. The replenishment pump 1005 moves ink corresponding to the consumed ink from the main tank 1006 to the buffer tank 1003 in a case where liquid is consumed in the liquid ejection head 3 by ejecting (discharging) ink from the ejection port of the liquid ejection head, such as in printing while ejecting ink and suction recovery.

The first circulation pump 1002 has a role to draw liquid from a liquid connection portion 111 of the liquid ejection head 3 and cause the liquid to flow to the buffer tank 1003. It is preferable for the first circulation pump 1002 to be a capacity pump having the ability to send liquid quantitatively. Specifically, there is a tube pump, gear pump, diaphragm pump, syringe pump or the like, but it is also possible to use even an aspect in which, for example, a general constant flow rate valve or a relief valve is arranged at the pump exit and a constant flow rate is secured. In a case where the liquid ejection head 3 is driven, by the first circulation pump 1002, a predetermined amount of ink flows within a common collection flow path 212. It is preferable to set the flow rate to a rate or higher at which the difference in temperature between each printing element substrate within the liquid ejection head 3 does not affect the print image quality. However, in a case where too high a flow rate is set, image density unevenness occurs because the difference in negative pressure between each printing element substrate 10 becomes too large due to the influence of the pressure drop in the flow path within the liquid ejection head 3. Because of this, it is preferable to set the flow rate by taking into consideration the difference in temperature and the difference in negative pressure between each printing element substrate 10.

A negative pressure control unit 230 is provided in a path between a second circulation pump 1004 and a liquid ejection unit 300. Consequently, the negative pressure control unit 230 has a function to operate to maintain the pressure on the downstream side (that is, on the side of the liquid ejection unit 300) of the negative pressure control unit 230 at a predetermined pressure set in advance even in a case where the flow rate of the circulation system varies due to the difference in duty to perform printing. As two pressure adjustment mechanisms configuring the negative pressure control unit 230, any mechanism may be used as long as the mechanism is capable of controlling the pressure on the downstream side of the mechanism itself with variations less than or equal to a predetermined range with a desired set pressure as a center. As one example, it is possible to adopt the same mechanism as that of the so-called "pressure-reducing regulator". In a case where the pressure-reducing regulator is used, as shown in FIG. 2, it is preferable to apply pressure to the upstream side of the negative pressure control unit 230 via a liquid supply unit 220 by the second circulation pump 1004. By doing so, it is possible to suppress the influence of the water head pressure on the liquid ejection head 3 of the buffer tank 1003, and therefore, it is possible to increase the degree of freedom of the layout of the buffer tank 1003 in the printing apparatus 1000. As the second circulation pump 1004, any pump may be acceptable which has a pump head pressure higher than or equal to a predetermined pressure in the range of the ink circulation flow rate used at the time of drive of the liquid ejection head 3 and it may be possible to use a turbo pump or a volume pump. Specifically, it is possible to apply a diaphragm pump or the like. Further, it is also possible to apply a water head tank arranged with a predetermined water head difference with respect to, for example, the negative pressure control unit 230 in place of the second circulation pump 1004.

As shown in FIG. 2, the negative pressure control unit 230 comprises two pressure adjustment mechanisms to which control pressures different from each other are set. Of the two negative pressure adjustment mechanisms, a relatively high pressure set side (described as H in FIG. 2) and a relatively low pressure side (described as L in FIG. 2) are each connected to a common supply flow path 211 and the common collection flow path 212 within the liquid ejection unit 300 through the inside of the liquid supply unit 220. The liquid ejection unit 300 is provided with the common supply flow path 211, the common collection flow path 212, and an individual supply flow path 213 and an individual collection flow path 214 both communicating with each printing element substrate. The individual supply flow path 213 and the individual collection flow path 214 communicate with the common supply flow path 211 and the common collection flow path 212, respectively. Due to this, part of the liquid caused to flow by the first circulation pump 1002 passes through the internal flow path of the printing element substrate 10 from the common supply flow path 211 and flows to the common collection flow path 212 (arrow in FIG. 2). The reason is that a difference in pressure is provided between a pressure adjustment mechanism H connected to the common supply flow path 211 and a pressure adjustment mechanism L connected to the common collection flow path 212 and the first circulation pump 1002 is connected only to the common collection flow path 212.

In this manner, in the liquid ejection unit 300 a flow of liquid passing through the inside of the common collection flow path 212 and a flow passing through the internal flow path within each printing element substrate 10 from the common supply flow path 211 into the common collection flow path 212 occur. Because of this, it is possible to discharge heat generated in each printing element substrate 10 to the outside of the printing element substrate 10 by the flow from the common supply flow path 211 to the common collection flow path 212 while suppressing an increase in pressure loss. Further, due to the configuration such as this, while performing printing by the liquid ejection head 3, it is possible to cause a flow of ink to occur also in the ejection port and the pressure chamber in which printing is not performed, and therefore, it is possible to suppress thickening of ink at the region. Furthermore, it is possible to discharge the thickened ink and foreign matter in the ink to the common collection flow path 212. Because of this, it is made possible for the liquid ejection head 3 of the present embodiment to perform fast printing with a high image quality.

(Description of Liquid Ejection Head)

Figure 3A:
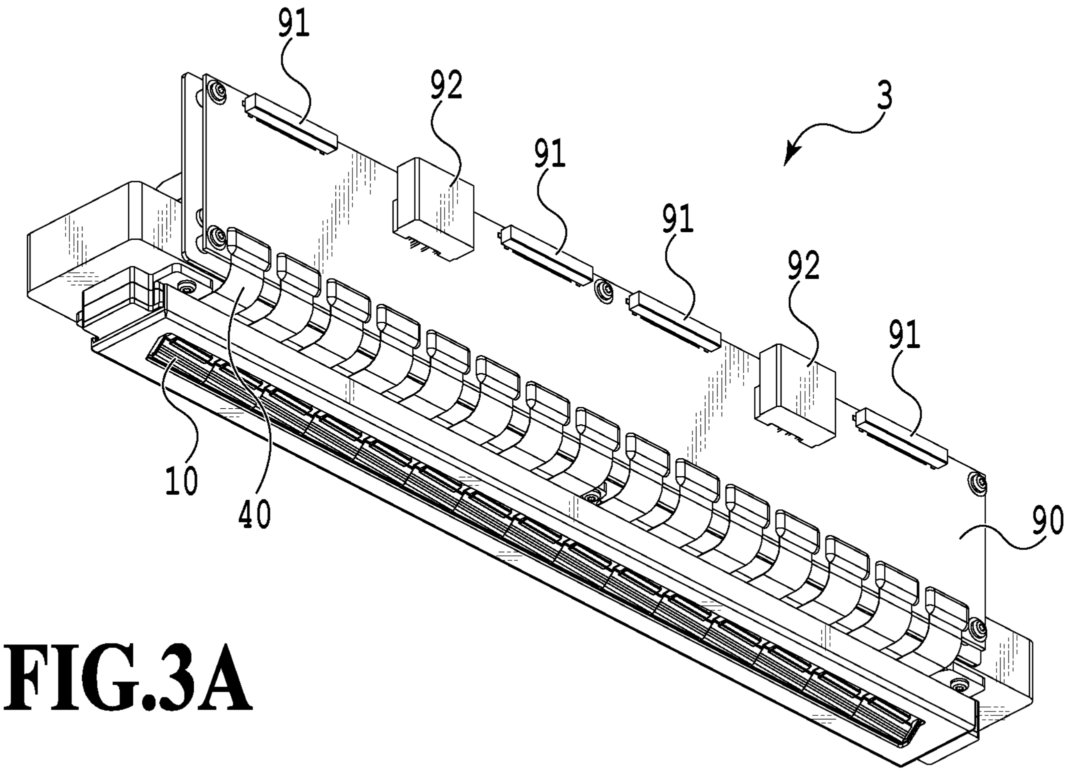
FIG. 3A and FIG. 3B are each a perspective diagram of a liquid ejection head according to the present disclosure.
Figure 3B:
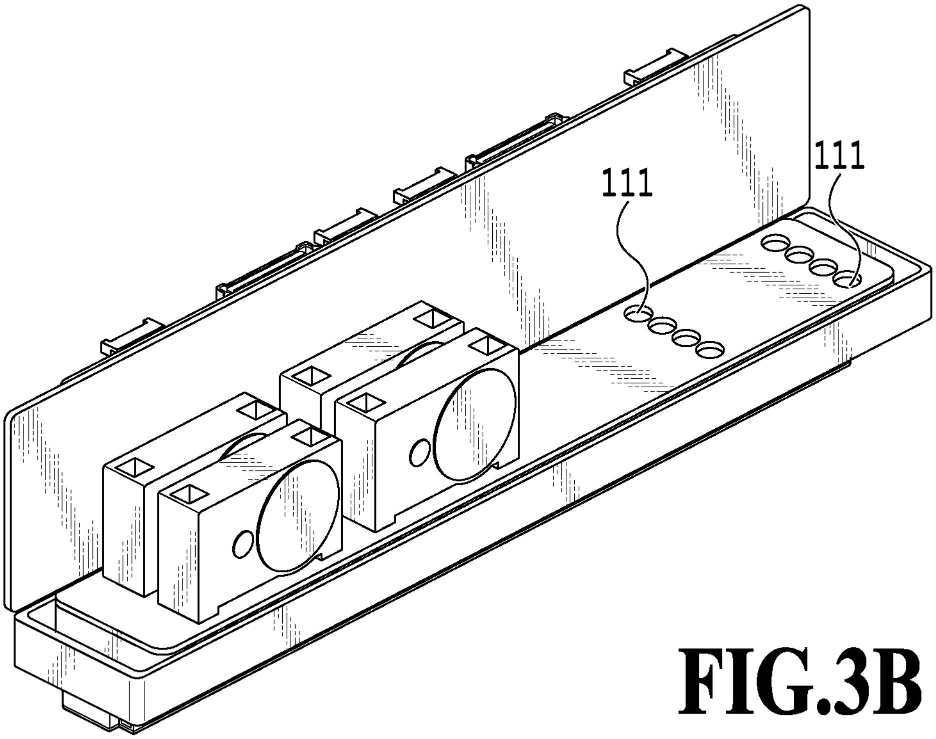

The configuration of the liquid ejection head 3 according to the present embodiment is explained. FIG. 3A and FIG. 3B are each a perspective diagram of the liquid ejection head 3 according to the present embodiment. The liquid ejection head 3 is a line liquid ejection head in which the 15 printing element substrates 10 are arrayed on a straight line (arranged in-line), each printing element substrate 10 being capable of ejecting inks of a plurality of colors. As shown in FIG. 3A, the liquid ejection head 3 comprises each printing element substrate 10, and signal input terminals 91 and electric power supply terminals 92 electrically connected via a flexible wiring substrate 40 and an electrical wiring substrate 90. The signal input terminal 91 and the electric power supply terminal 92 are connected electrically with the control unit of the printing apparatus 1000 and each supplies an ejection driving signal and electric power necessary for ejection to the printing element substrate 10. By putting wiring together by an electric circuit within the electrical wiring substrate 90, it is possible reduce the number of signal input terminals 91 and electric power supply terminals 92 compared to the number of printing element substrates 10. Due to this, in a case where the liquid ejection head 3 is attached to the printing apparatus 1000 or the liquid ejection head is exchanged with another, the number of electrical connection portions that need to be removed is reduced. As shown in FIG. 3B, the liquid connection portions 111 provided on one side of the liquid ejection head 3 are connected with a liquid supply system of the printing apparatus 1000. Due to this, ink is supplied from the supply system of the printing apparatus 1000 to the liquid ejection head 3 and further, the ink having passed through the inside of the liquid ejection head 3 is collected to the supply system of the printing apparatus 1000. As described above, it is possible for the ink of each color to circulate via the path of the printing apparatus 1000 and the path of the liquid ejection head 3.

Figure 4:
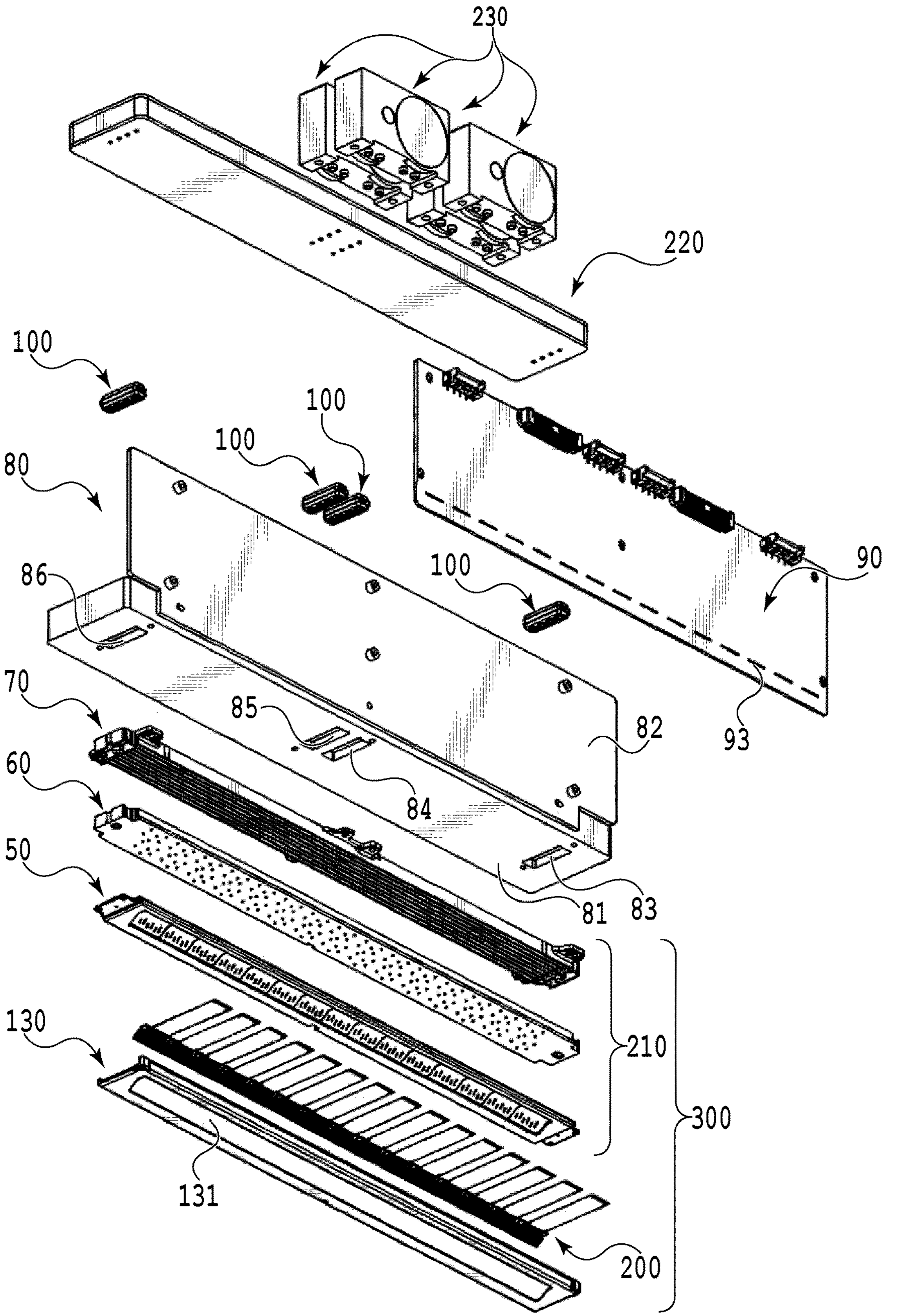
FIG. 4 is an exploded perspective diagram of the liquid ejection head according to the present disclosure.

Next, the configuration of the liquid ejection head 3 is explained specifically with reference to FIG. 4. FIG. 4 shows an exploded perspective diagram of each part or unit configuring the liquid ejection head 3. The liquid ejection unit 300, the liquid supply unit 220, and the electrical wiring substrate 90 are attached to a casing 80. The liquid supply unit 220 is provided with the liquid connection portions 111 (see FIG. 3) and at the same time, inside the liquid supply unit 220, a filer 221 (see FIG. 2) for each color, which communicates with each opening of the liquid connection portions 111, is provided in order to remove foreign matter in the supplied ink. The liquid supply unit 220 is provided with the filters 221 for four colors. The liquid having passed through the filter 221 is supplied to the negative pressure control unit 230 arranged on the liquid supply unit 220 in correspondence to each color. The negative pressure control unit 230 is a unit including a pressure adjustment valve for each color. The negative pressure control unit 230 considerably reduces the change in pressure drop within the supply system (supply system on the upstream side of the liquid ejection head 3) of the printing apparatus 1000, which occurs accompanying the variations of the flow rate of liquid, by the action of a valve, a spring member and the like, each provided inside the negative pressure control unit 230. Due to this, it is possible for the negative pressure control unit 230 to stabilize the change in negative pressure on the downstream side (on the side of the liquid ejection unit 300) of the pressure control unit within a certain predetermined range. Within the negative pressure control unit 230 of each color, the two pressure adjustment valves for each color as in FIG. 2 are incorporated and each is set to a different control pressure. Then, the high-pressure side of the negative pressure control unit 230 communicates with the common supply flow path 211 within the liquid ejection unit 300 and the low-pressure side communicates with the common collection flow path 212 via the liquid supply unit 220.

The casing 80 includes a liquid ejection unit support portion 81 and an electrical wiring substrate support portion 82 and secures the rigidity of the liquid ejection head 3 as well as supporting the liquid ejection unit 300 and the electrical wiring substrate 90. The electrical wiring substrate support portion 82 is for supporting the electrical wiring substrate 90 and fixed to the liquid ejection unit support portion 81 with screws. The liquid ejection unit support portion 81 has a role to secure the relative position accuracy of a plurality of the printing element substrates 10 by correcting the warp and deformation of the liquid ejection unit 300, and therefore, suppresses streak and unevenness in a printed material. Because of this, it is preferable for the liquid ejection unit support portion 81 to have a sufficient rigidity and as the material, metal material, such as SUS and aluminum, or ceramic, such as alumina, is appropriate. The liquid ejection unit support portion 81 is provided with openings 83, 84, 85, and 86 into which a joint rubber 100 is inserted. The liquid supplied from the liquid supply unit 220 is guided to a flow path member 210 configuring the liquid ejection unit 300 via the joint rubber.

The liquid ejection unit 300 includes a plurality of ejection modules 200 and the flow path member 210 and to the surface on the printing medium side of the liquid ejection unit 300, a cover member 130 is attached. Here, the cover member 130 is a member provided with a long opening 131 and having a surface in the shape of a picture frame as shown in FIG. 4, and from the opening 131, the printing element substrate 10 and a sealing portion 110 (FIG. 8) included in the ejection module 200 are exposed. The frame portion on the periphery of the opening 131 has a function as an abutting surface of a cap member capping the liquid ejection head 3 at the time of the printing standby. Because of this, it is preferable for a closed space to be formed at the time of capping by applying a bonding adhesive, a sealing material, a filling material or the like along the periphery of the opening 131 to fill in concavities and convexities and gaps on the ejection port surface of the liquid ejection unit 300.

Next, the configuration of the flow path member 210 included in the liquid ejection unit 300 is explained. As shown in FIG. 4, the flow path member 210 is configured by laminating a first flow path member 50, a second flow path member 60, and a third flow path member 70. Then, the flow path member 210 is a flow path member for distributing the liquid supplied from the liquid supply unit 220 to each ejection module 200 and returning the liquid flowing back from the ejection module 200 to the liquid supply unit 220. The flow path member 210 is fixed to the liquid ejection unit support portion 81 with screws and due to this, the warp and deformation of the flow path member 210 are suppressed.

Figure 5A:
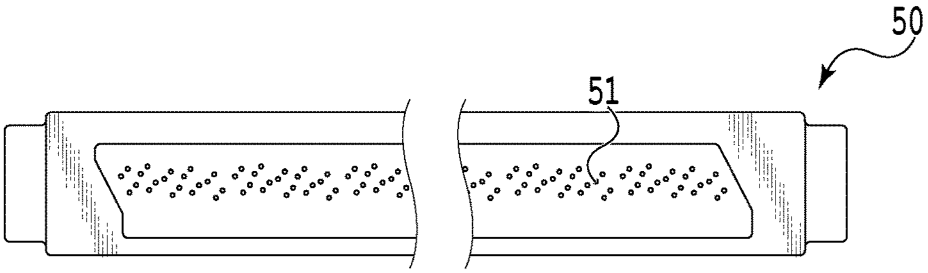
FIG. 5A to FIG. 5F are diagrams showing a front surface and a back surface of each flow path member of the liquid ejection head according to the present disclosure.
Figure 5B:
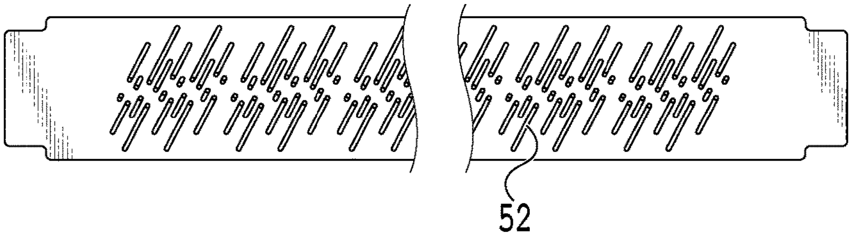
Figure 5C:
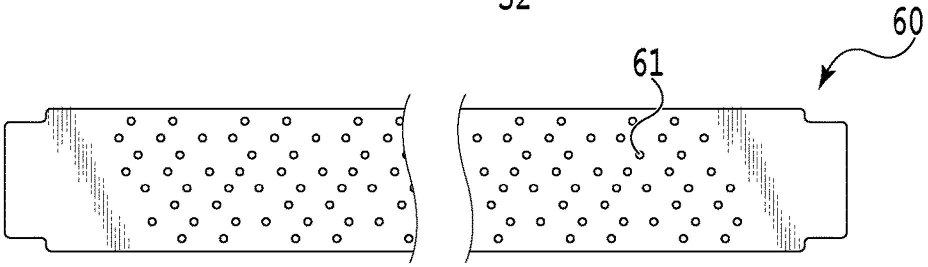
Figure 5D:
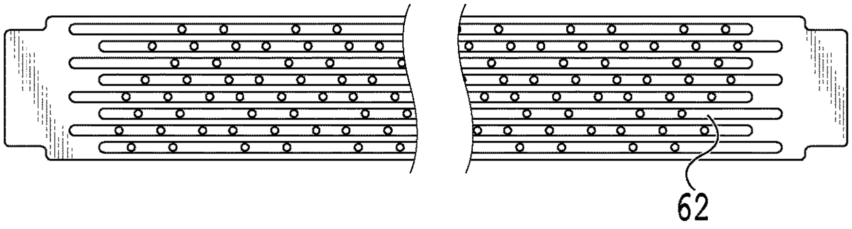
Figure 5E:
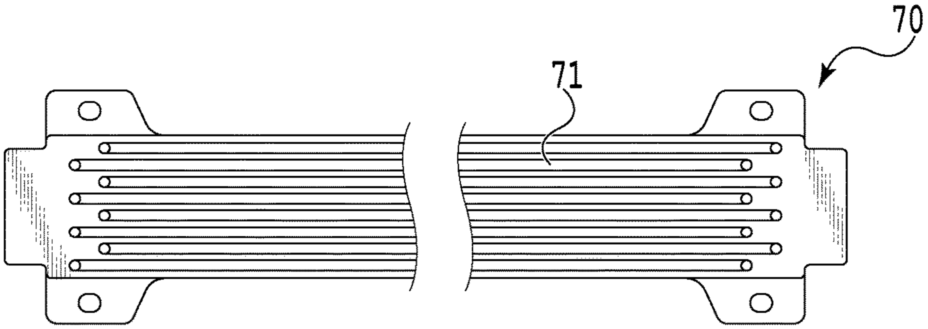
Figure 5F:
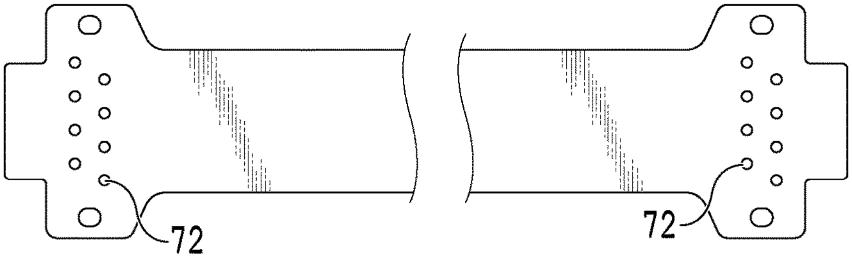

FIG. 5A to FIG. 5F are diagrams showing the front surface and the back surface of each flow path member of the first to third flow path members. FIG. 5A shows the surface on the side of the first flow path member 50, on which the ejection module 200 is mounted, and FIG. 5F shows the surface on the side of the third flow path member 70, which comes into contact with the liquid ejection unit support portion 81. The first flow path member 50 and the second flow path member 60 are bonded to each other so that the contacting surface of the first flow path member 50 in FIG. 5B and the contacting surface of the second flow path member 60 in FIG. 5C face each other, and the second flow path member 60 and the third flow path member 70 are bonded to each other so that the contacting surface of the second flow path member 60 in FIG. 5D and the contacting surface of the third flow path member 70 in FIG. 5E face each other. By bonding the second flow path member 60 and the third flow path member 70 to each other, eight common flow paths extending in the longitudinal direction of the flow path members are formed by common flow path grooves 62 and common flow path grooves 71 formed in each flow path member. Due to this, for each color of the liquid, the set of the common supply flow path 211 and the common collection flow path 212 is formed within the flow path member 210 (see FIG. 6). A communication port 72 of the third flow path member 70 communicates with each hole of the joint rubber 100 and circulates fluidly with the liquid supply unit 220. On the bottom surface of the common flow path grooves 62 of the second flow path member 60, a plurality of communication ports 61 is formed, each communicating with one end portion of an individual flow path grooves 52 of the first flow path member 50. On the other end portion of the individual flow path grooves 52 of the first flow path member 50, a communication port 51 is formed and via the communication port 51, the first flow path member 50 communicates fluidly with a plurality of the ejection modules 200. By this individual flow path grooves 52, it is made possible to put together the flow path members to the flow path on the center side.

It is preferable for the first to third flow path members to consist of a material whose coefficient of linear expansion is low as well as having a corrosion resistance against liquid. As the basic material of the flow path member, it is possible to appropriately use, for example, alumina, LCP (liquid crystal polymer), PPS (polyphenylene sulfide), PSF (poly sulfone), and modified PPE (polyphenylene ether). Then, as the material of the flow path member, it is possible to appropriately use a compound material (resin material) obtained by adding inorganic fillers, such as silica fine particles and fibers, to the basic material of the flow path member. As the formation method of the flow path member 210, it may also be possible to bond the three flow path members to one another by laminating them, or in a case where a resin compound resin material is selected as a material, it may also be possible to use a bonding method by welding.

Figure 6:
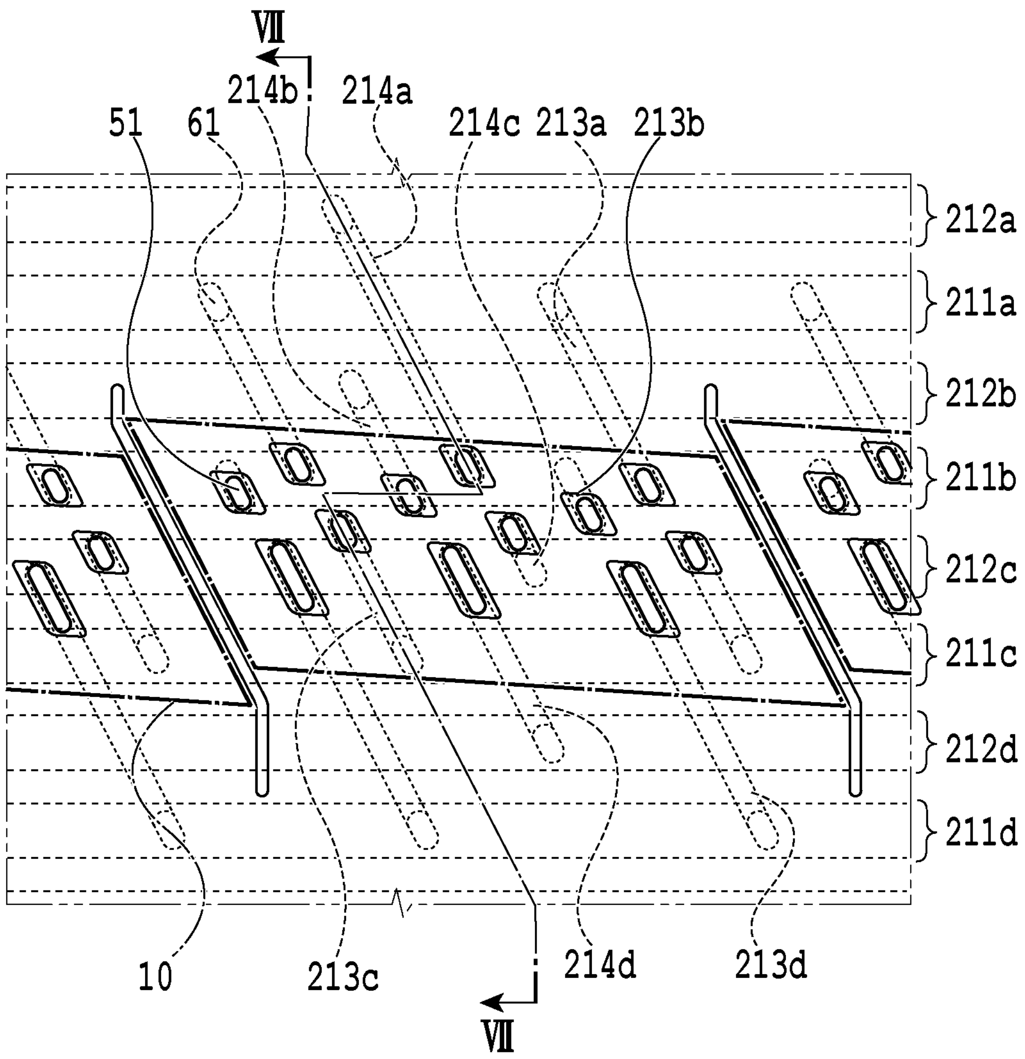
FIG. 6 is a partially enlarged perspective diagram in a case where flow paths within a flow path member of the liquid ejection head according to the present disclosure are viewed from an ejection module side.

Next, by using FIG. 6, the connection relationship between each flow path within the flow path member 210 is explained. FIG. 6 is an enlarged perspective diagram in a case where part of the flow path within the flow path member 210 formed by bonding the first to third flow path members is viewed from the side of the surface on which the ejection module 200 of the first flow path member 50 is mounted. The flow path member 210 is provided with the common supply flow paths 211 (211*a*, 211*b*, 211*c*, 211*d*) and the common collection flow paths 212 (212*a*, 212*b*, 212*c*, 212*d*) extending in the longitudinal direction of the liquid ejection head 3 for each color. To the common supply flow path 211 of each color, a plurality of the individual supply flow paths 213 (213*a*, 213*b*, 213*c*, 213*d*) formed by the individual flow path grooves 52 is connected via the communication port 61. Further, to the common collection flow path 212 of each color, a plurality of the individual collection flow paths 214 (214*a*, 214*b*, 214*c*, 214*d*) formed by the individual flow path grooves 52 is connected via the communication port 61. By the flow path configuration such as this, it is possible to put ink together to the printing element substrate 10 located at the center portion of the flow path member from each common supply flow path 211 via the individual supply flow paths 213. Further, it is possible to collect ink to each common collection flow path 212 from the printing element substrate 10 via the individual collection flow path 214.

Figure 7:
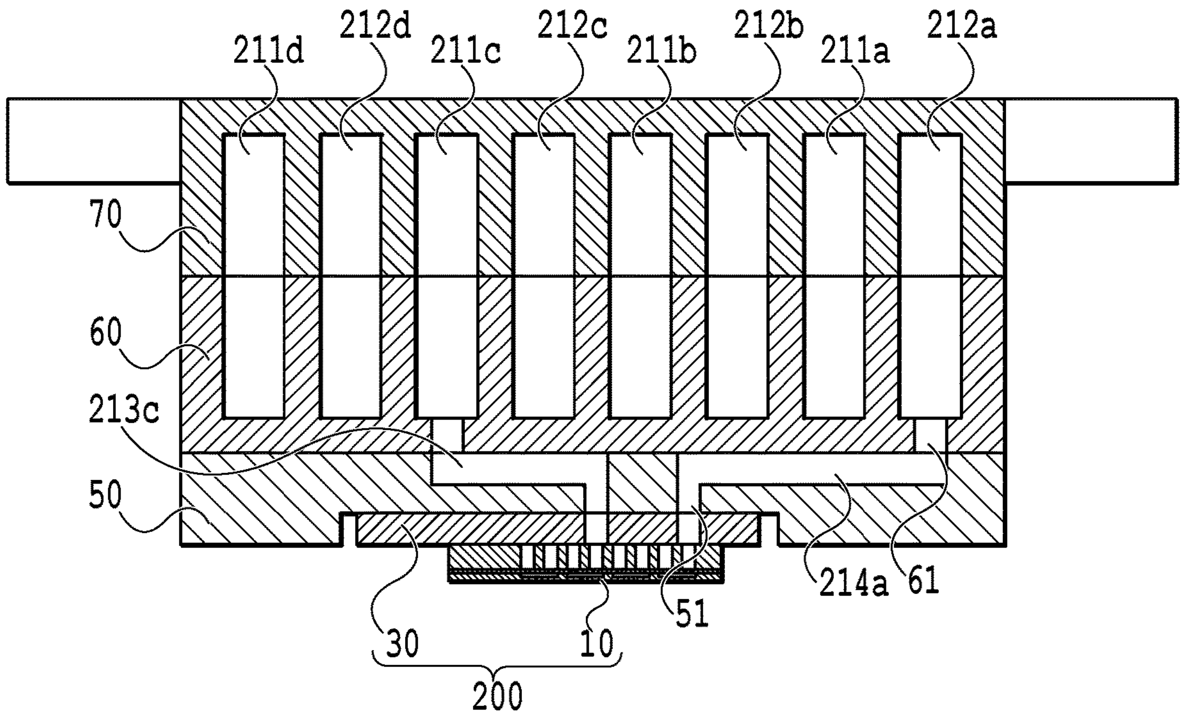
FIG. 7 is a cross-sectional diagram along a VII-VII line in FIG. 6.

FIG. 7 is a diagram showing a cross section along a VII-VII line in FIG. 6. As shown in FIG. 7, the individual supply flow path 213*c* and the individual collection flow path 214*a* each communicate with the ejection module 200 via the communication port 51. In FIG. 7, only the individual supply flow path 213*c* and the individual collection flow path 214*a* are shown schematically. On the other hand, in another cross section, as shown in FIG. 6, the other individual supply flow paths (213*a*, 213*b*, 213*d*) and the other individual collection flow paths (214*b*, 214*c*, 214*d*) each communicate with the ejection module 200. In a support member 30 and the printing element substrate 10 included in each ejection module 200, a flow path is formed, which is for supplying the ink from the first flow path member 50 to a printing element 15 (see FIG. 9) formed on the printing element substrate 10. Further, in the support member 30 and the printing element substrate 10 included in each ejection module 200, a flow path is formed, which is for collecting part or all of the liquid supplied to the printing element 15 (for causing part or all of the liquid supplied to the printing element 15 to flow back) to the first flow path member 50. Here, the common supply flow path 211 of each color is connected with the negative pressure control unit 230 (high-pressure side) of the corresponding color via the liquid supply unit 220 and the common collection flow path 212 is connected with the negative pressure control unit 230 (low-pressure side) via the liquid supply unit 220. By the negative pressure control unit 230, a difference in pressure (pressure difference) is caused to occur between the common supply flow path 211 and the common collection flow path 212. Because of this, within the liquid ejection head of the present embodiment, in which each flow path is connected as shown in FIG. 6 and FIG. 7, a flow that flows in the order of the common supply flow path 211, the individual supply flow path 213, the printing element substrate 10, the individual collection flow path 214, and the common collection flow path 212 occurs for each color.

(Description of Ejection Module)

Figure 8A:
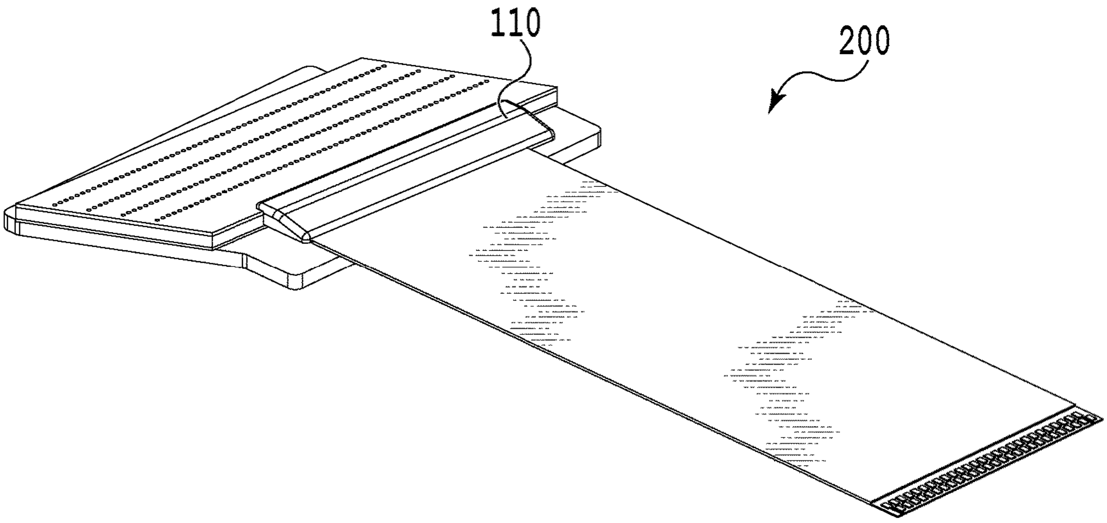
FIG. 8A and FIG. 8B are a perspective diagram and an exploded diagram, respectively, of one liquid ejection module of the liquid ejection head according to the present disclosure.
Figure 8B:
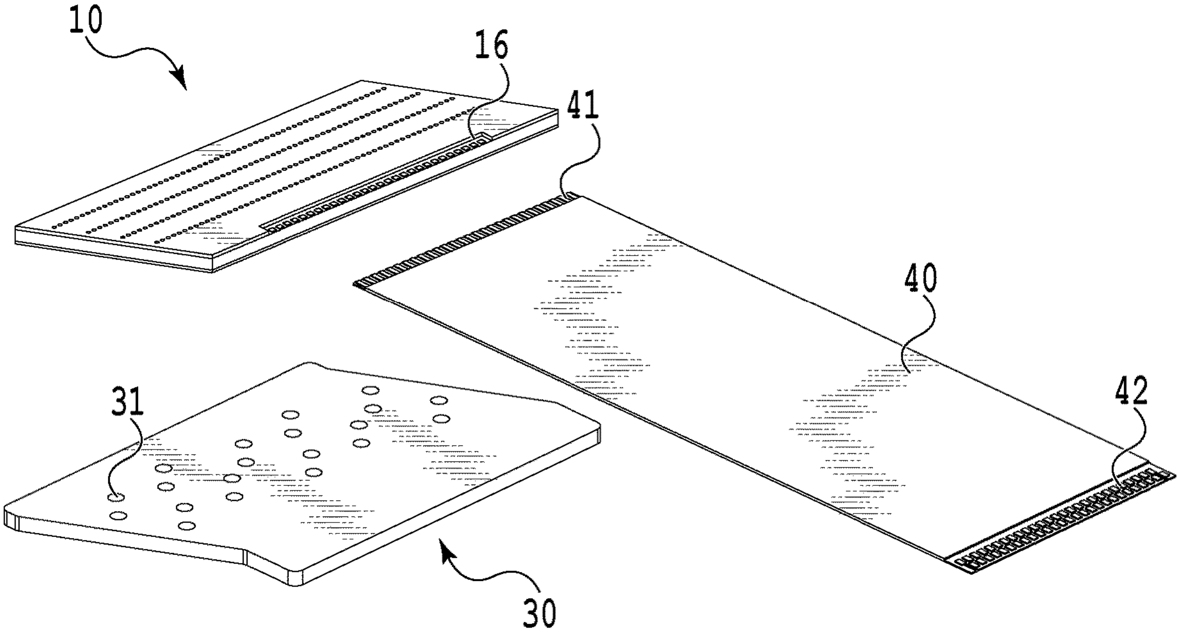

FIG. 8A shows a perspective diagram of the one ejection module 200 and FIG. 8B shows an exploded diagram of the ejection module 200. As a manufacturing method of the ejection module 200, first, the printing element substrate 10 and the flexible wiring substrate 40 are bonded onto the support member 30 provided in advance with a liquid communication port 31. After that, a terminal 16 on the printing element substrate 10 and a terminal 41 on the flexible wiring substrate 40 are connected electrically by wire bonding, and after that, the sealing portion 110 is formed by covering the wire bonding portion (electrical connection portion) with a sealing member. A terminal 42 on the opposite side of the printing element substrate 10 of the flexible wiring substrate 40 is connected electrically with a connection terminal 93 (see FIG. 4) of the electrical wiring substrate 90. The support member 30 is a support body supporting the printing element substrate 10 and at the same time, a flow path member causing the printing element substrate 10 and the flow path member 210 to communicate fluidly with each other, and therefore, it is preferable for the support member 30 to have a high flatness and further be capable of being bonded to the printing element substrate with a high enough reliability. As the material of the support member 30, for example, alumina or a resin material is preferable.

(Description of Printing Element Substrate)

Figure 9A:
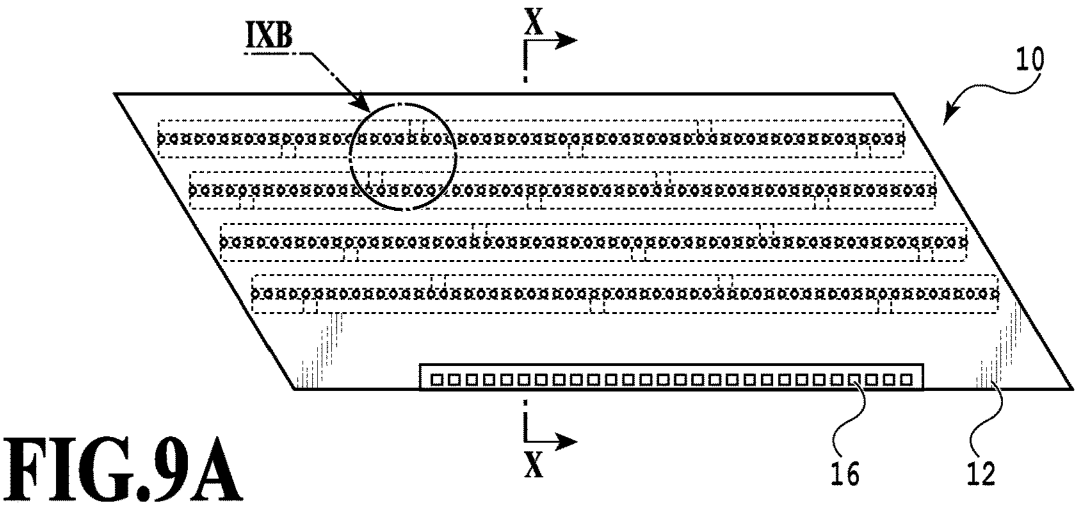
FIG. 9A to FIG. 9C are a plan diagram and a partially enlarged diagram on an ejection port side of a printing element substrate of the liquid ejection head according to the present disclosure.
Figure 9B:
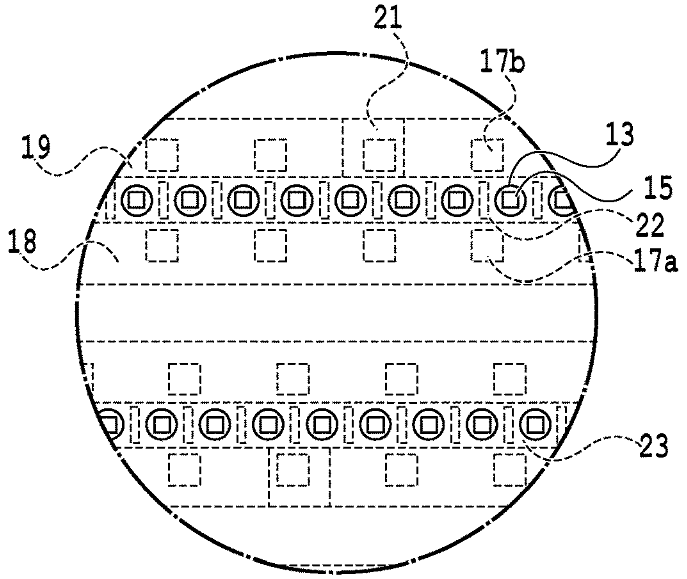
Figure 9C:
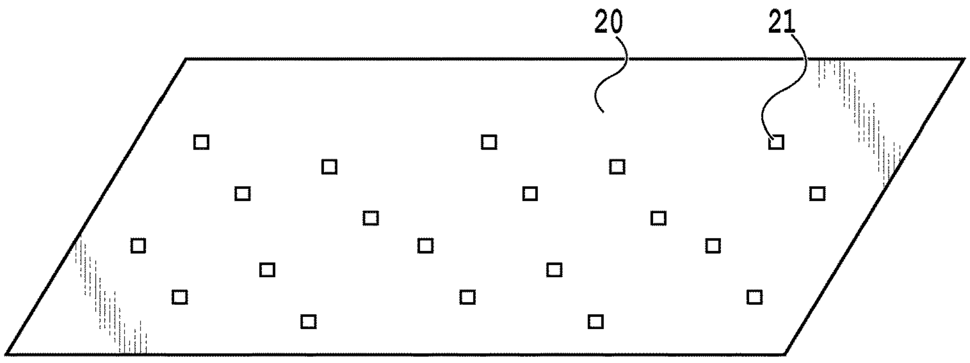

The configuration of the printing element substrate 10 in the present embodiment is explained. FIG. 9A shows a plan diagram of the surface on the side on which an ejection port 13 of the printing element substrate 10 is formed, FIG. 9B shows an enlarged diagram of the portion indicated by IXB in FIG. 9A, and FIG. 9C shows a plan diagram of the back surface of the printing element substrate 10 in FIG. 9A. As shown in FIG. 9A, on an ejection port formation member 12 of the printing element substrate 10, four ejection port rows corresponding to each ink color are formed. In the following, the direction in which the ejection port row in which a plurality of the ejection ports 13 is arrayed extends is called "ejection port row direction".

As shown in FIG. 9B, at the position corresponding to each ejection port 13, the printing element 15 is arranged, which is a heating element for causing liquid to foam by thermal energy. By a partition 22, a pressure chamber 23 comprising the printing element 15 inside thereof is sectioned. The printing element 15 is connected electrically with the terminal 16 in FIG. 9A by electrical wiring (not shown schematically) provided on the printing element substrate 10. Then, the printing element 15 generates heat and causes liquid to boil based on a pulse signal input from the control circuit of the printing apparatus 1000 via the electrical wiring substrate 90 (FIG. 4) and the flexible wiring substrate 40 (FIG. 8B). By the force of foaming by this boiling, the liquid is ejected from the ejection port 13. As shown in FIG. 9B, along each ejection port row, on one side, a liquid supply path 18 extends and on the other side, a liquid collection path 19 extends. The liquid supply path 18 and the liquid collection path 19 are each a flow path extending in the ejection port row direction, which are provided on the printing element substrate 10, and communicate with the ejection port 13 via a supply port 17*a* and a collection port 17*b*, respectively.

Figure 10:
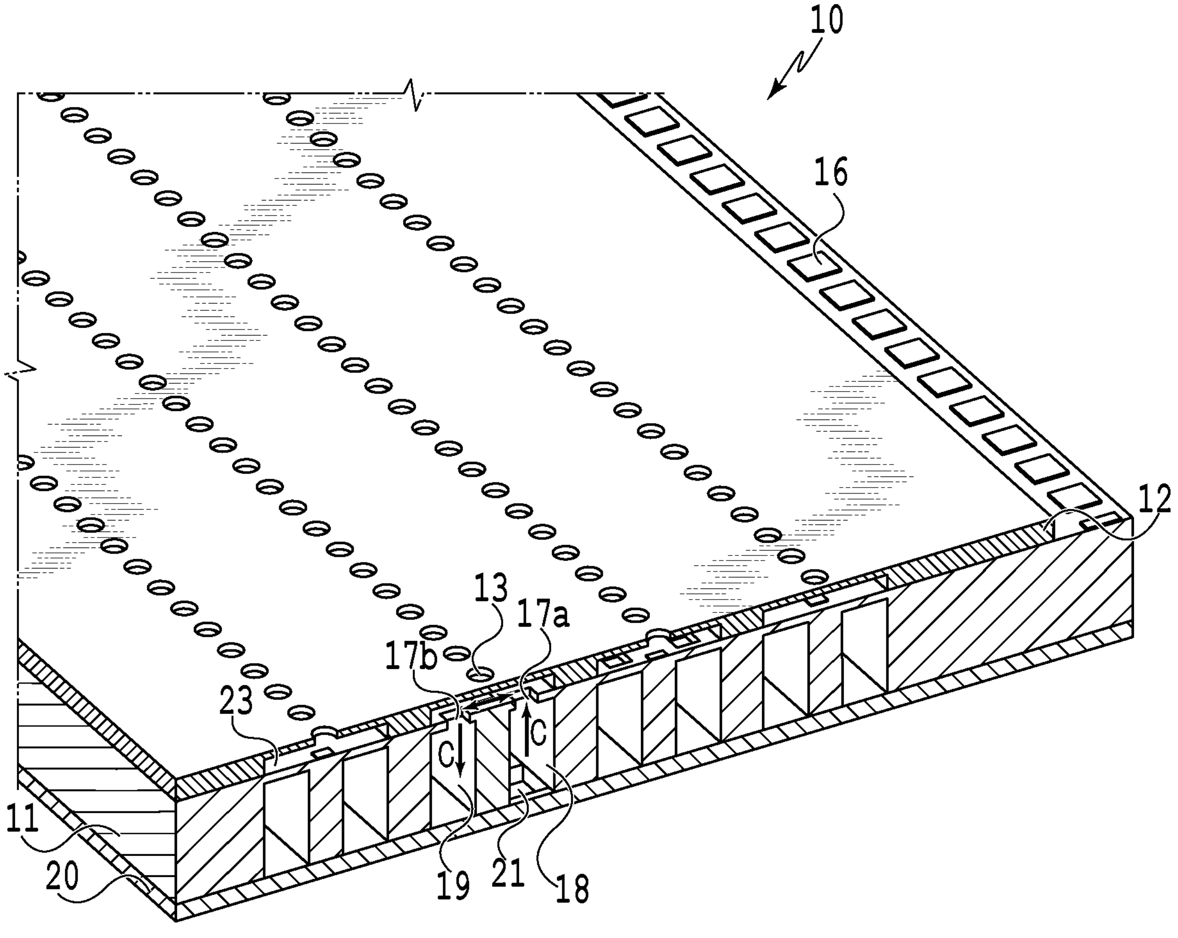
FIG. 10 is a cross-sectional perspective diagram of a X-X plane in FIG. 9.

FIG. 10 is a perspective diagram showing a cross section along a X-X line in FIG. 9A of the printing element substrate 10 and a lid member 20. As shown in FIG. 9C and FIG. 10, on the back surface of the surface on which the ejection port 13 is formed of the printing element substrate 10, the sheet-shaped lid member 20 is laminated and on the lid member 20, a plurality of openings 21 communicating with the liquid supply path 18 and the liquid collection path 19, to be described later, is provided. In the present embodiment, for example, for the one liquid supply path 18, the three openings 21 are provided and for the one liquid collection path 19, the two openings 21 are provided on the lid member 20. As shown in FIG. 9B, each opening 21 of the lid member 20 communicates with a plurality of the communication ports 51 shown in FIG. 5A. As shown in FIG. 10, the lid member 20 has a function as a lid forming part of the wall of the liquid supply path 18 and the liquid collection path 19 formed on a substrate of the printing element substrate 10. It is preferable for the lid member 20 to have a sufficient corrosion resistance against liquid and from the standpoint of preventing color mixing, a high accuracy is required for the opening shape and the opening position of the opening 21. Because of this, it is preferable to use a photosensitive resin material or a silicon plate as the material of the lid member 20 and provide the opening 21 by the photolithography process. As described above, the lid member 20 converts the pitch of the flow path by the opening 21 and in view of pressure loss, it is desirable for the lid member 20 to be thin and configured by a film-shaped member.

Next, the flow of liquid within the printing element substrate 10 is explained. The printing element substrate 10 is configured by laminating the substrate 11 formed by silicon and the ejection port formation member 12 formed by a photosensitive resin and to the back surface of the substrate 11, the lid member 20 is bonded. On one surface side of the substrate 11, the printing element 15 (see FIG. 9B) is formed and on the back surface side thereof, grooves configuring the liquid supply path 18 and the liquid collection path 19 extending along the ejection port row are formed. The liquid supply path 18 and the liquid collection path 19 formed by the substrate 11 and the lid member 20 are connected with the common supply flow path 211 and the common collection flow path 212, respectively, within the flow path member 210 and a difference in pressure occurs between the liquid supply path 18 and the liquid collection path 19. During the printing by ejecting liquid from the plurality of the ejection ports 13 of the liquid ejection head 3, a difference in pressure occurs in the ejection port not performing the ejection operation. By this difference in pressure, the liquid within the liquid supply path 18 provided within the substrate 11 flows (flow indicated by arrow C in FIG. 10) to the liquid collection path 19 via the supply port 17*a*, the pressure chamber 23, and the collection port 17*b*. By this flow, in the ejection port 13 not performing printing and the pressure chamber 23, it is possible to collect thickened ink caused by evaporation from the ejection port 13, bubbles, foreign matter and the like to the liquid collection path 19. Further, it is possible to suppress the ink in the ejection port 13 and the pressure chamber 23 from thickening. The liquid collected to the liquid collection path 19 is collected to the communication port 51 within the flow path member 210, the individual collection flow path 214, and the common collection flow path 212 in this order through the opening 21 and the liquid communication port 31 (see FIG. 8B) and finally collected to the supply path of the printing apparatus 1000.

That is, the liquid supplied from the printing apparatus main body to the liquid ejection head 3 flows in the following order and is supplied and collected. In the circulation path shown in FIG. 2, the liquid first flows into the inside of the liquid ejection head 3 from the liquid connection portion 111 of the liquid supply unit 220 and is supplied to the joint rubber 100 after passing through the negative pressure control unit 230. Then, the liquid is supplied to the communication port 72 and the common flow path grooves 71 provided on the third flow path member, the common flow path grooves 62 and the communication port 61 provided on the second flow path member, and the individual flow path grooves 52 and the communication port 51 provided on the first flow path member in this order. After that, the liquid is supplied to the pressure chamber 23 via the liquid communication port 31 provided on the support member 30, the opening 21 provided on the lid member 20, and the liquid supply path 18 and the supply port 17*a* provided on the substrate 11 in this order. The liquid that is not ejected from the ejection port 13 of the liquid supplied to the pressure chamber 23 flows through the collection port 17*b* and the liquid collection path 19 provided on the substrate 11, the opening 21 provided on the lid member 20, and the liquid communication port 31 provided on the support member 30 in this order. After that, the liquid flows through the communication port 51 and the individual flow path grooves 52 provided on the first flow path member, the communication port 61 and the common flow path grooves 62 provided on the second flow path member, the common flow path grooves 71 and the communication port 72 provided on the third flow path member 70, and the joint rubber 100 in this order. Then, the liquid flows from the liquid connection portion 111 provided on the liquid supply unit 220 to the outside of the liquid ejection head 3. As described above, in the liquid ejection head of the present embodiment, it is possible to suppress the liquid in the pressure chamber and at the portion in the vicinity of the ejection port from thickening, and therefore, it is possible to suppress dot miss-alignment in ejection and non-ejection, and as a result, it is possible to perform printing with a high image quality.

In the present embodiment, the material of the ejection port formation member is a photosensitive resin, but the present disclosure is not limited to this and it is possible to appropriately apply the configuration of the present disclosure also in a case where, for example, silicon, metal, ceramic, glass, or another material is used.

(Description of Positional Relationship Between Printing Element Substrates)

Figure 11:
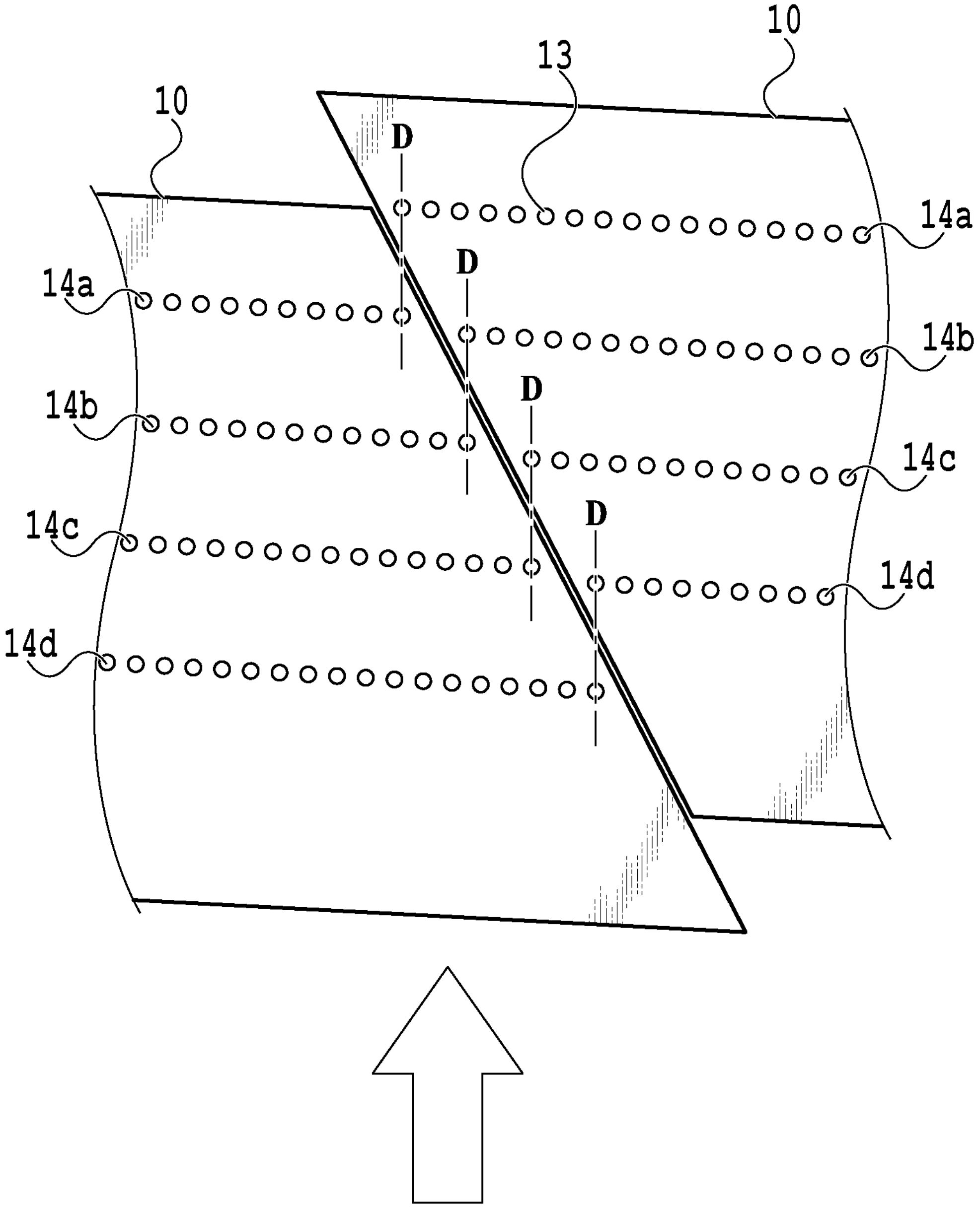
FIG. 11 is a partially enlarged diagram of adjacent printing element substrates of the liquid ejection head according to the present disclosure.

FIG. 11 is a partially enlarged plan diagram showing an adjacent portion between printing element substrates in two adjacent ejection modules. As shown in FIG. 9A, in the present embodiment, the printing element substrate in the shape of an approximate parallelogram is used. As shown in FIG. 11, each ejection port row (14*a* to 14*d*) in which the ejection ports 13 are arrayed on each printing element substrate 10 is arranged so as to be inclined by a predetermined degree with respect to the conveyance direction of a printing medium. Due to this, the ejection port row at the adjacent portion between the printing element substrates 10 is arranged so that at least one ejection port overlaps another in the conveyance direction of a printing medium. In FIG. 11, the two ejection ports on a D line are in an overlap relationship with each other. By the arrangement such as this, even in a case where the position of the printing element substrate 10 shifts somewhat from a predetermined position, it is possible to make a black streak and a blank area in a printed image less conspicuous by the drive control of the overlapping ejection ports. It may also be possible to arrange a plurality of the printing element substrates 10 on a straight line (in-line) in place of the staggered arrangement. In a case where the plurality of the printing element substrates 10 is arranged on a straight line, it is also possible to take measures against the black steak and blank area at the connection portion between the printing element substrates 10 while suppressing an increase in length of the liquid ejection head 3 in the conveyance direction of a printing medium (in the direction of arrow in FIG. 11) by the configuration as in FIG. 11. In the present embodiment, the main surface of the printing element substrate is a parallelogram, but the present disclosure is not limited to this and it is possible to appropriately apply the configuration of the present disclosure also in a case where the printing element substrate in the shape of, for example, a rectangle, trapezoid, or in another shape is used.

Description of Embodiments of the Present Disclosure

First Embodiment

A first embodiment of the present disclosure is explained. Description of the same function and configuration as those of the basic configuration of the present disclosure is omitted and different points are explained.

(Description Relating to Protection Member and Printing Element Substrate)

Figure 12A:
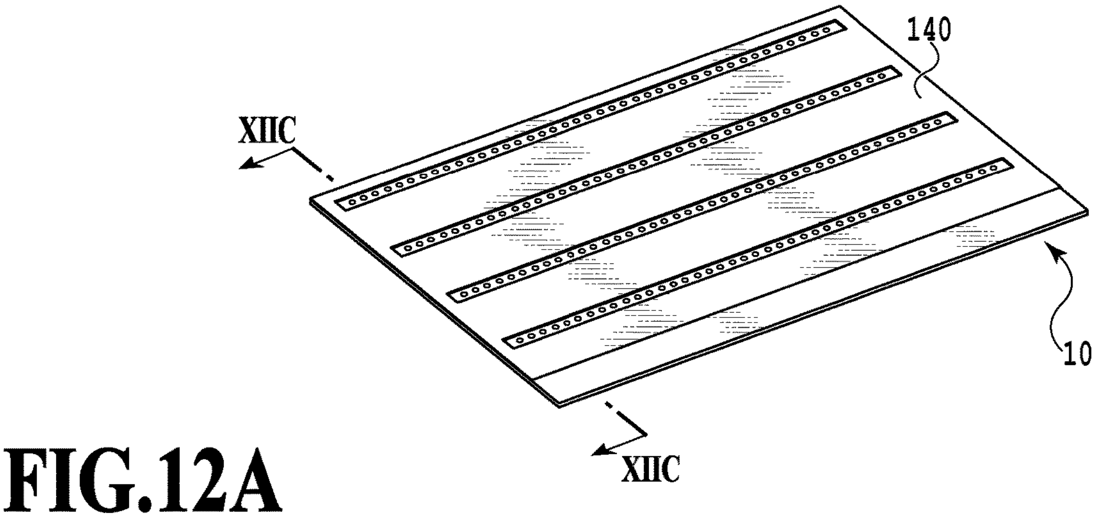
FIG. 12A to FIG. 12C are a perspective diagram, an exploded perspective diagram, and a cross-sectional diagram, respectively, of a liquid ejection module of a liquid ejection head according to a first embodiment.
Figure 12B:
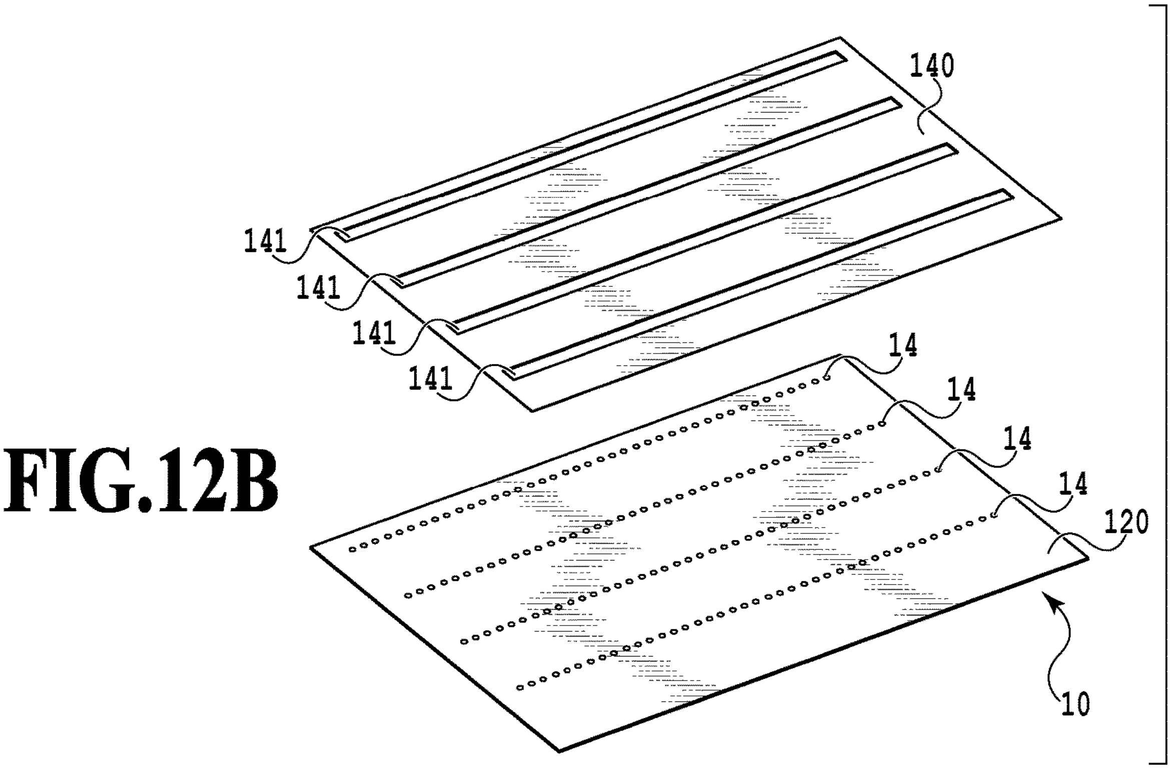
Figure 12C:
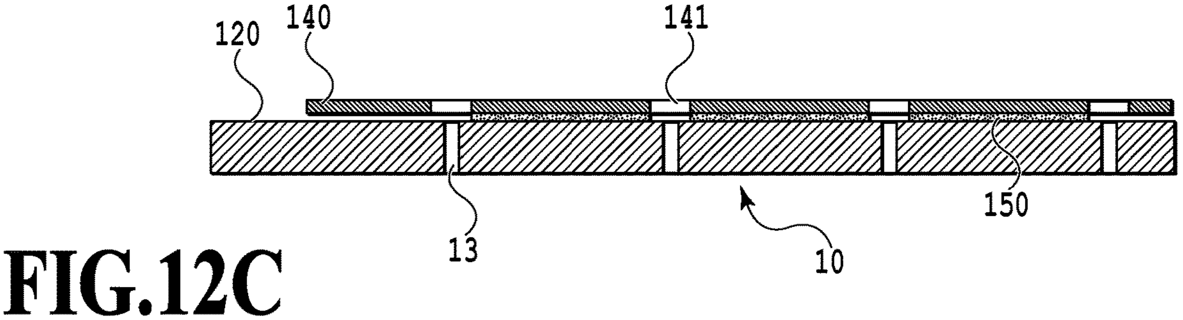

FIG. 12A is a perspective diagram of a simplified ejection module in the first embodiment. FIG. 12B is an exploded perspective diagram of FIG. 12A. FIG. 12C is a cross-sectional diagram along a XIIC-XIIC line in FIG. 12A. The first embodiment differs from the basic configuration in that a protection member 140 is laminated on the front surface (ejection surface 120) of the ejection port formation member 12. Specifically, as shown in FIG. 12A to FIG. 12C, the liquid ejection head 3 comprises the first liquid ejection module and the second liquid ejection module. The first liquid ejection module and the second liquid ejection module each comprise the printing element substrate 10 and the protection member 140. The printing element substrate 10 has the ejection surface 120 on which a plurality of ejection port rows 14 ejecting liquid is formed. The protection member 140 has an opening 141 for each ejection port row 14 and the ejection surface 120 is bonded to the protection member 140 with a bonding adhesive 150 being applied between the ejection port rows 14.

The ejection surface 120 is cleaned by a cleaning mechanism (not shown schematically) while in contact therewith as will be described later. The cleaning mechanism is, for example, a wiper that comes into contact with the ejection surface 120 and the protection member 140 and cleans them. In order for the cleaning mechanism to collect the liquid within the liquid ejection head 3 more appropriately, it is preferable to design the configuration so that there is no gap between the ejection surface 120 and the protection member 140 in the vicinity of the ejection port row 14. Because of this, it is desirable for the protection member 140 to be bonded to the ejection surface 120 so that the floating of the protection member 140 is unlikely to occur.

Figure 13A:
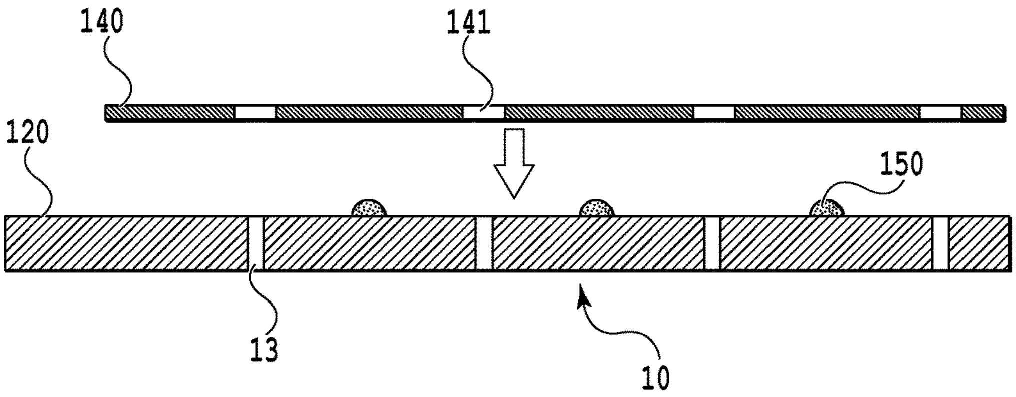
FIG. 13A to FIG. 13C are schematic diagrams showing a state where a bonding adhesive is applied in FIG. 12A to FIG. 12C.
Figure 13B:
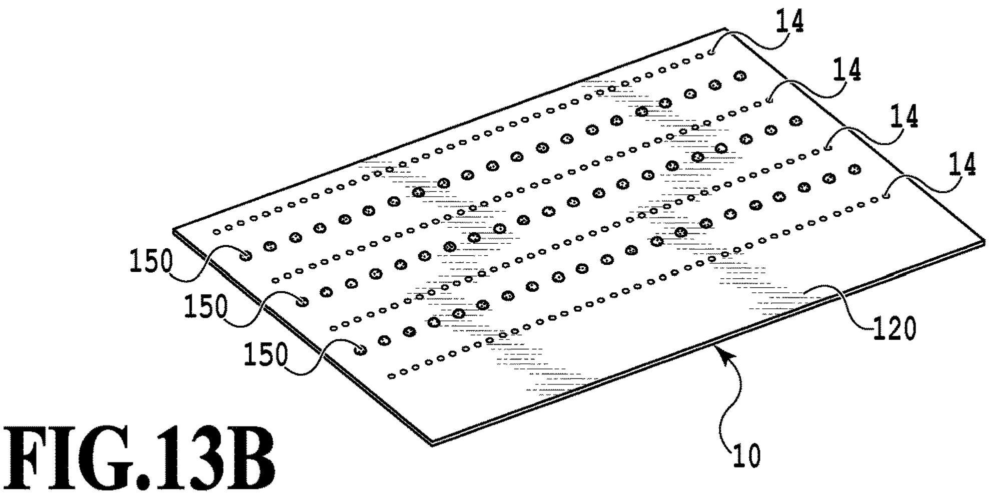
Figure 13C:
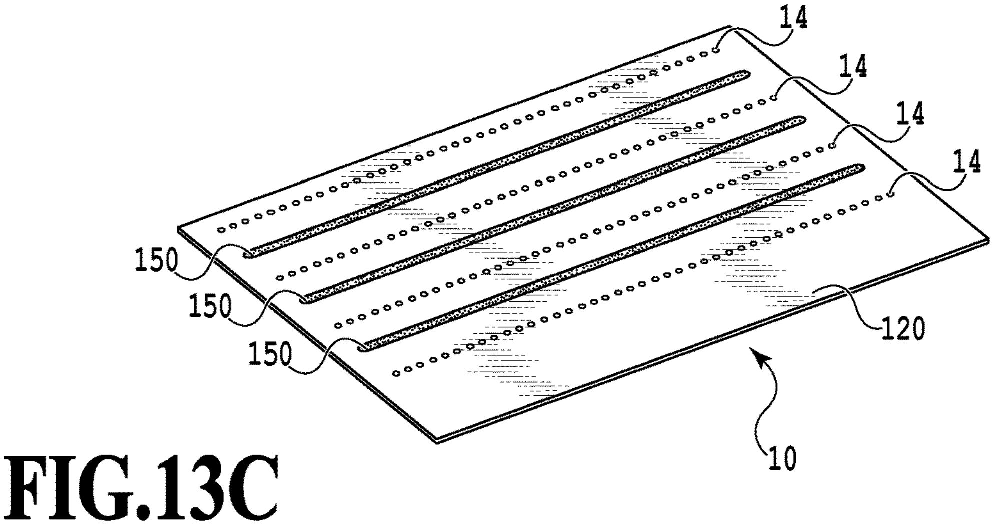

In the present embodiment, as shown in FIG. 13A to FIG. 13C, as one example, on the ejection surface 120, the bonding adhesive 150 is applied between the adjacent ejection port rows 14 and the ejection surface 120 is bonded to the protection member 140 with the bonding adhesive 150. As shown in FIG. 13A, the protection member 140 is moved in the direction of an arrow and boded to the ejection surface 120. As shown in FIG. 13B, the bonding adhesive 150 is applied intermittently between the adjacent ejection port rows 14 in the extending direction of the ejection port row, and therefore, it is possible to reduce the amount of the bonding adhesive 150 to be used. Further, it is possible to reduce the possibility that the bonding adhesive 150 bulges out to the side of the ejection port 13 and the bonding adhesive 150 flows into the ejection port 13 at the time of the application of the bonding adhesive and thermohardening. In a case where the bonding adhesive 150 is applied between the adjacent ejection port rows 14, as shown in FIG. 13B, it is preferable to apply the bonding adhesive to a part (for example, center portion) between the adjacent ejection port rows 14 in the array direction in which the ejection port rows 14 are arrayed.

On the other hand, as shown in FIG. 13C, it may also be possible to apply the bonding adhesive 150 continuously in the direction in which the ejection port row extends only between the adjacent ejection port rows 14 of the ejection surface 120. Due to this, it is possible to increase the bonding strength with the bonding adhesive 150. In addition, by applying the bonding adhesive 150 only between the adjacent ejection port rows 14, it is possible to suppress the bonding adhesive 150 from bulging out to the end portion in the longitudinal direction of the printing element substrate 10. By designing the configuration such as this, as shown in FIG. 11, in a case where a plurality of the printing element substrates 10 is arranged on a straight line (in-line), it is possible to prevent trouble that it is no longer possible to arrange the printing element substrate due to the bonding adhesive having bulged out.

Figure 14A:
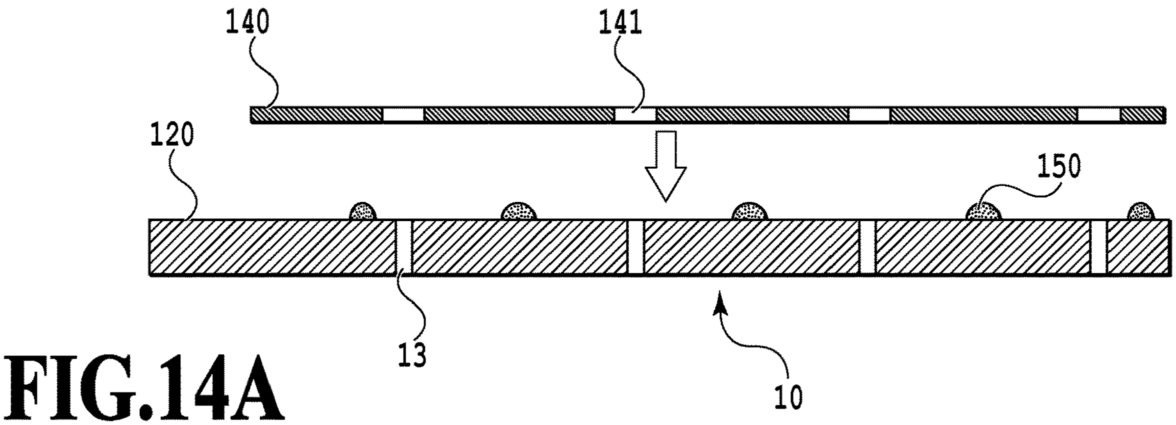
FIG. 14A to FIG. 14C are schematic diagrams showing one example of a state where a bonding adhesive is applied in the liquid ejection module of the liquid ejection head according to the first embodiment.
Figure 14B:
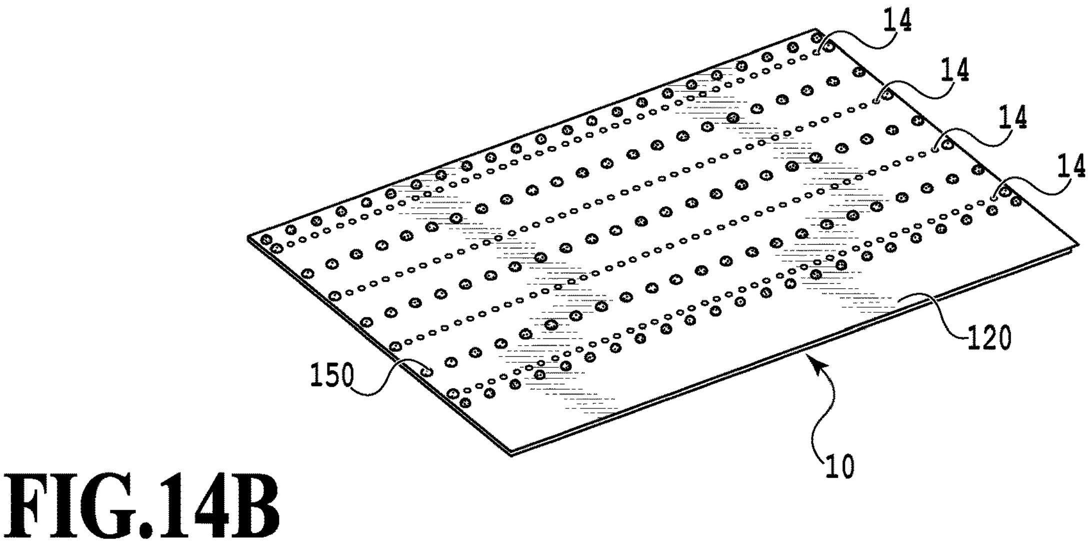
Figure 14C:
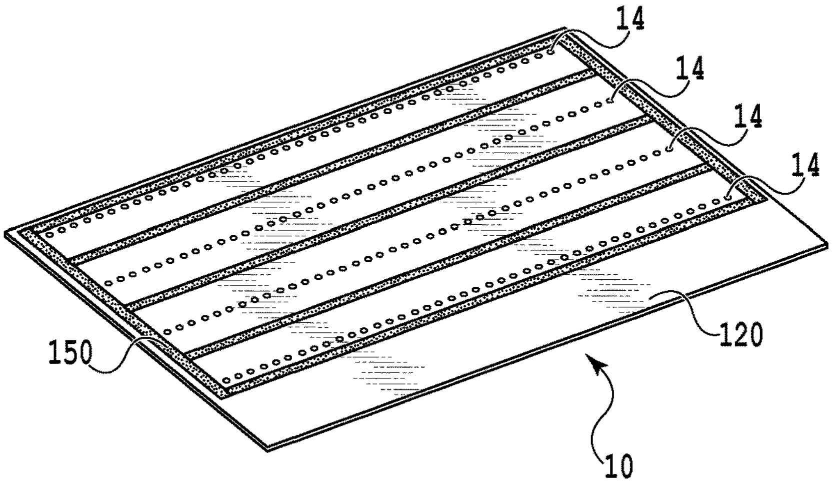

On the other hand, as shown in FIG. 14A to FIG. 14C, it may also be possible to apply the bonding adhesive 150 so as to surround each of the plurality of the ejection port rows 14. After that, as shown in FIG. 14A, the protection member 140 is moved in the direction of an arrow and bonded to the ejection surface 120. By designing the configuration such as this, it is possible to increase the bonding force between the ejection surface 120 and the protection member 140 with the bonding adhesive 150 because the area to which the bonding adhesive 150 is applied increases. Further, in order to increase the bonding force between the ejection surface 120 and the protection member 140 more, it may also be possible to appropriately use a method in which an adhesive layer (not shown schematically) is formed at least on the side of the ejection surface 120 of the protection member 140. As the bonding adhesive 150, for example, it is possible to appropriately use a thermohardening bonding adhesive.

Due to the configuration such as this, in a case where the printing medium 2 (see FIG. 1) floats during conveyance, the protection member 140 plays the role to prevent the printing medium 2 from coming into contact with the printing element substrate 10, and therefore, it is possible to reduce the possibility that the liquid ejection head 3 is damaged. Because of this, it is preferable for the material of the protection member 140 to have a modulus of elasticity higher than that of the material of the ejection port formation member 12. As the material of the protection member 140, it may also be possible to appropriately use a metal material, such as a stainless material and aluminum, silicon, and alumina. Among others, it is preferable for the material of the protection member 140 to be a material having a coefficient of linear explanation close to the coefficient of linear explanation of the material of the printing element substrate 10. Due to this, it is possible to reduce the possibility that the protection member 140 peels off from the ejection port formation member 12. The width of the opening 141 of the protection member 140 may be greater than or equal to the diameter of the ejection port and the thickness of the protection member 140 may be less than or equal to the thickness of the printing element substrate 10. It is preferable for the width of the opening 141 of the protection member 140 to be greater than or equal to 200 m and for the thickness of the protection member 140 to be less than 50 m. Due to this, it is possible to improve the ejection of liquid to the printing medium 2. Further, it is preferable for the outline and the opening 141 of the protection member 140 to have been processed with a high accuracy. As the processing method of the protection member 140, it may also be possible to appropriately use, for example, etching, laser processing, and machine processing. In a case where the processing method causes a burr or return at the edge portion of the outline and the opening 141 of the protection member 140, by using the surface on which the burr or return occurs as the bonding surface side to the ejection surface 120, it is possible to reduce the possibility that the cleaning mechanism (not shown schematically) is damaged. Further, it may also be possible to change the processing method of the protection member 140 for each of the front surface and the back surface and for each position of the protection member 140. For example, the outline and the opening 141 of the protection member 140 become a taper shape by etching, and therefore, by adjusting the taper angle by changing the etching condition between the front surface and the back surface of the protection member 140, it is also possible to facilitate the collection of the liquid within the liquid ejection head 3 more appropriately. It is possible to perform the processing method such as this comparatively easily with the configuration in which the opening 141 is provided for each ejection port row 14 as in the present disclosure, compared to the configuration in which the opening is formed for each ejection port.

(Wiping Operation and Sealing Member)

Figure 15A:
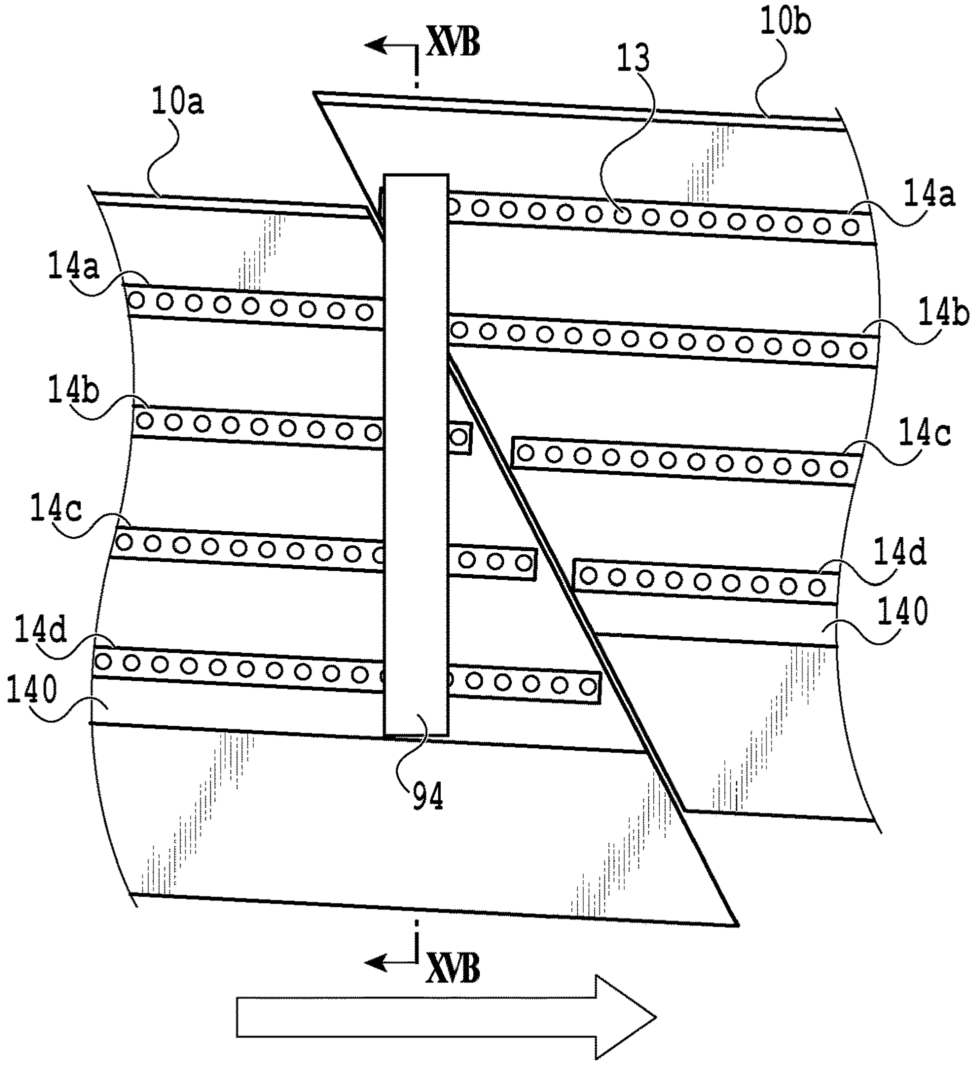
FIG. 15A and FIG. 15B are a partially enlarged schematic diagram and a cross-sectional diagram in a case where wiping is performed for a portion adjacent to a printing element substrate in the first embodiment.
Figure 15B:
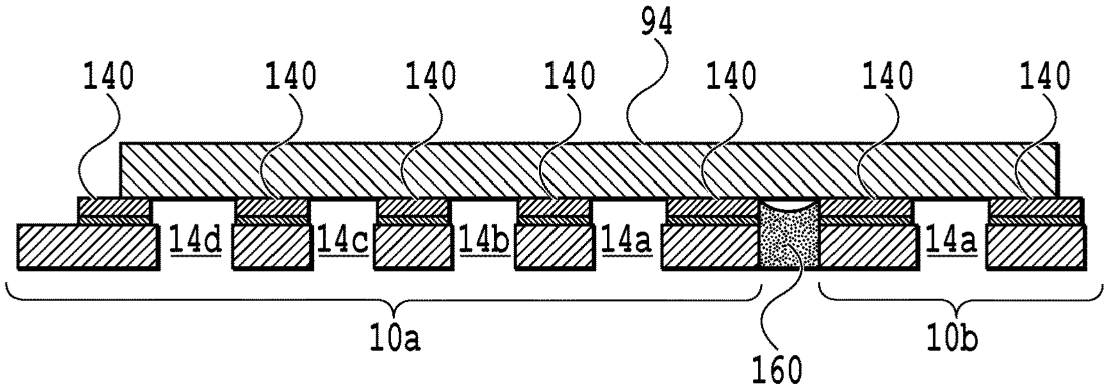
Figure 16A:
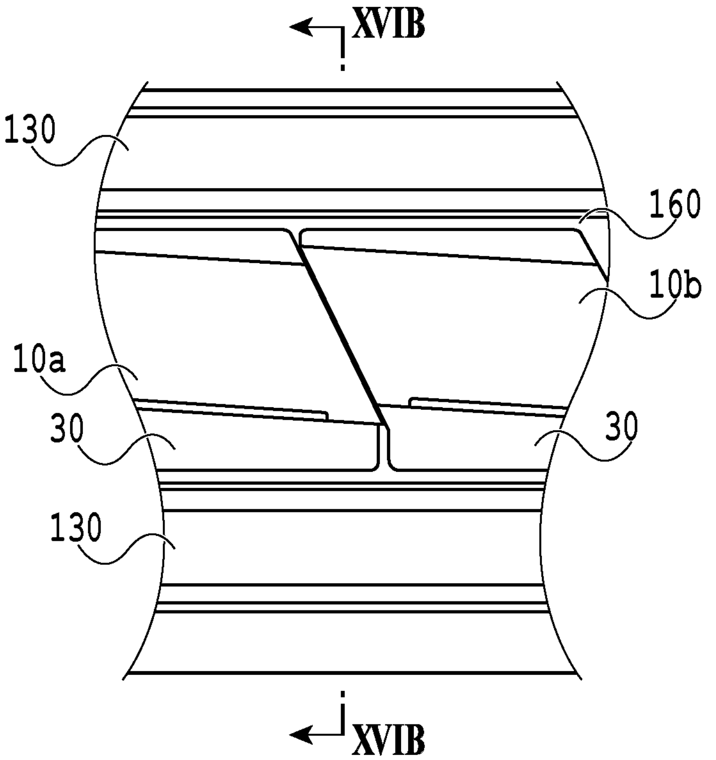
FIG. 16A and FIG. 16B are a top diagram and a cross-sectional diagram, respectively, in a case where adjacent printing element substrates are viewed from an ejection port side in the first embodiment.
Figure 16B:
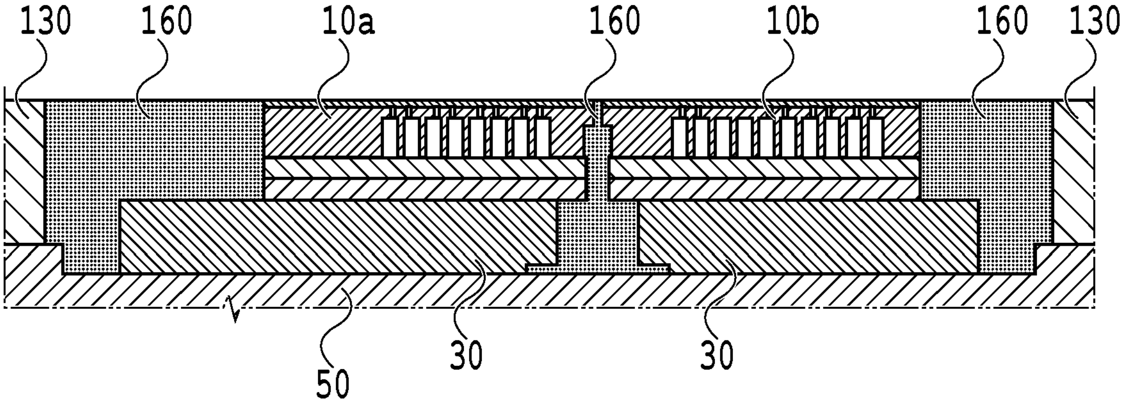

The wiping operation is explained, which is one of the cleaning mechanism of the liquid ejection apparatus in the present disclosure. FIG. 15A is a partially enlarged schematic diagram of the adjacent portions of the printing element substrates at the time of the wiping operation in the first embodiment and FIG. 15B is a cross-sectional diagram along a XVB-XVB line in FIG. 15A. FIG. 16B is a top diagram in a case where the adjacent printing element substrates in the first embodiment are viewed from the ejection port side and FIG. 16B is a cross-sectional diagram along a XVIB-XVIB line in FIG. 16A. In FIG. 16A and FIG. 16B, for simplification, the bonding adhesive, the sealing member 110 and the like are omitted.

As shown in FIG. 15A, a wiping member 94 performs the wiping operation by scanning in the direction (direction of arrow in FIG. 15A) in which the printing element substrates are arrayed while performing suction in the state of being in contact with the printing element substrate 10 or the protection member 140. The wiping member 94 with the configuration such as this means a vacuum wiper, which is one of the cleaning mechanism. Due to this, it is possible to remove the liquid having stuck to the surface of the printing element substrate 10 or the protection member 140, or air bubbles having entered the inside of the ejection port of the printing element substrate 10, and the like.

Incidentally, there is a case where the wiping member 94 enters the state of being in contact with both a printing element substrate 10*a* of the first liquid ejection module and a printing element substrate 10*b* of the second liquid ejection module, the printing element substrate 10*a* and the printing element substrate 10*b* being adjacent to each other. In this state, in a case where there is a space between the printing element substrates 10*a* and 10*b* adjacent to each other, an air leak occurs, and therefore, there is a possibility that the sufficient suction effect cannot be obtained. Because of this, as shown in FIG. 15B, the space (clearance) between the printing element substrates 10 adjacent to each other is filled in with a sealing member 160 to prevent the space from communicating with the outside air. It is preferable for the space between the printing element substrate 10*a* of the first liquid ejection module and the printing element substrate 10*b* of the second liquid ejection module to be less than or equal to 100 m in size. As a result of this, it is possible to prevent the air leak and obtain a desired suction effect. As shown in FIG. 16B, it is also necessary to seal, with the sealing member 160, not only the space between the adjacent printing element substrates 10*a* and 10*b* but also the space formed by the members, such as the printing element substrate 10, the cover member 130, the first flow path member 50, and the support member 30. Consequently, the sealing member 160 is also filled in the above-described space, and therefore, it is preferable to use a material whose fluidity is high. Further, the viscosity of the sealing member 160 before hardening is 15 Pa·s or less. Because of this, it is possible to cause the sealing member to flow into various spaces.

(Description Relating to Water-Repellent Area of Protection Member)

Figure 17A:
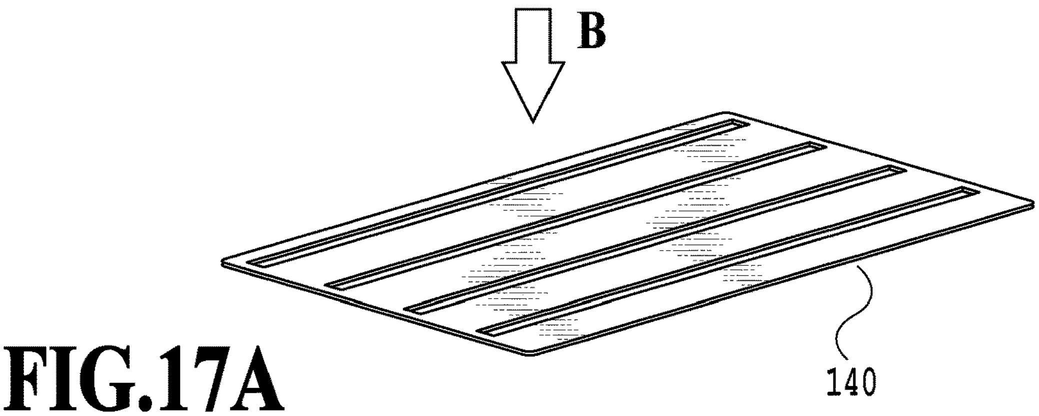
FIG. 17A to FIG. 17C are a schematic perspective diagram of a protection member, a diagram viewed form arrow viewpoint, and a top diagram viewed from an ejection port side of the liquid ejection head in the first embodiment.
Figure 17B:
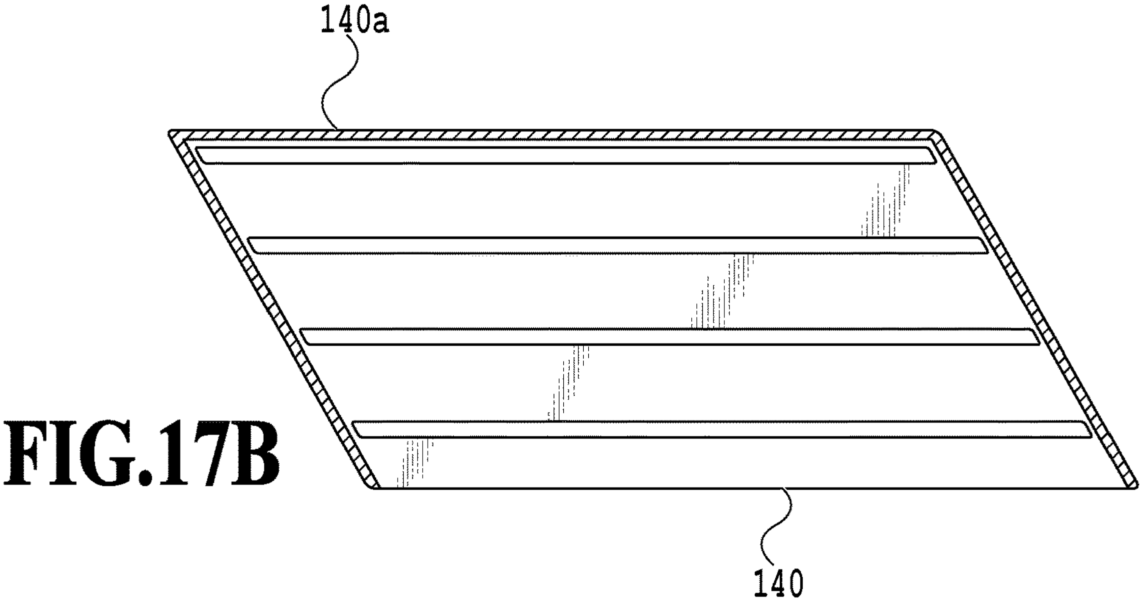
Figure 17C:
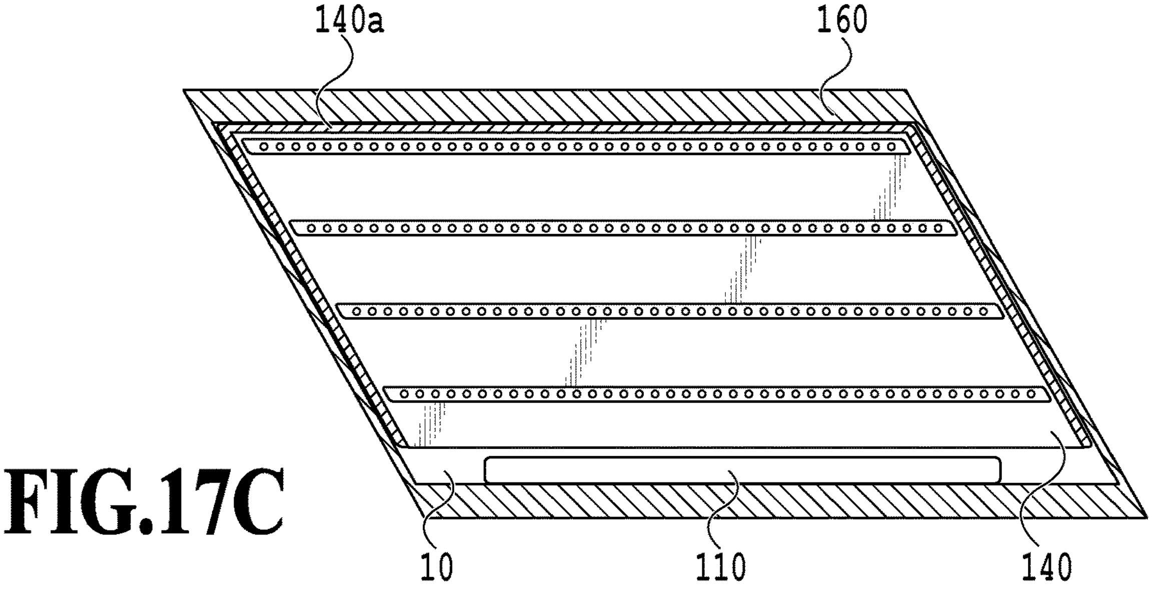
Figure 18:
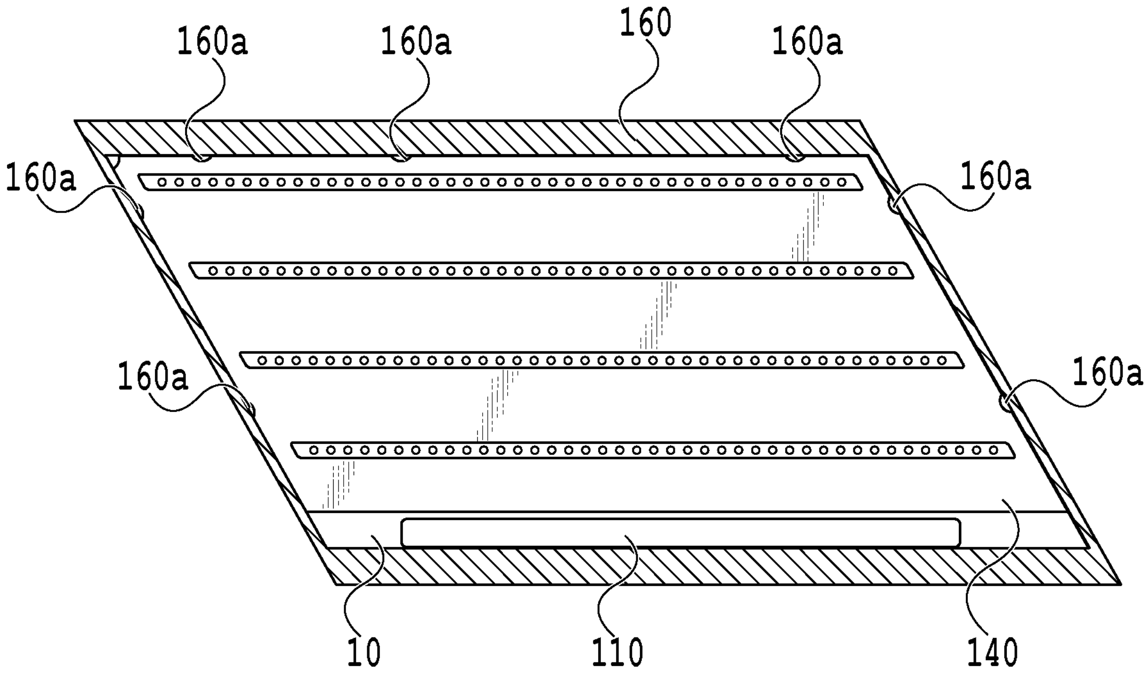
FIG. 18 is a top diagram in a case where a water-repellent portion is not provided in the protection member.
Figure 19A:
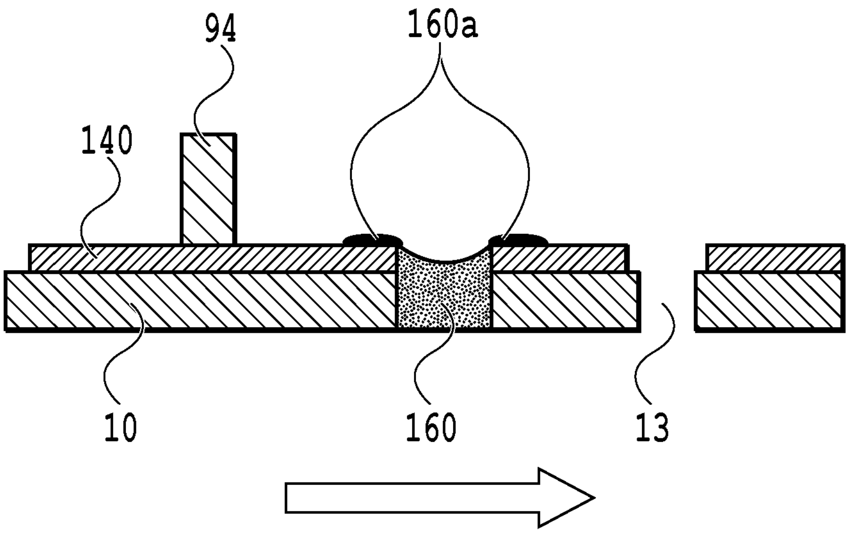
FIG. 19A and FIG. 19B are schematic cross-sectional diagrams showing before and after a wiping operation, respectively, in a case where a sealing member sticks to the surface of the protection member.
Figure 19B:
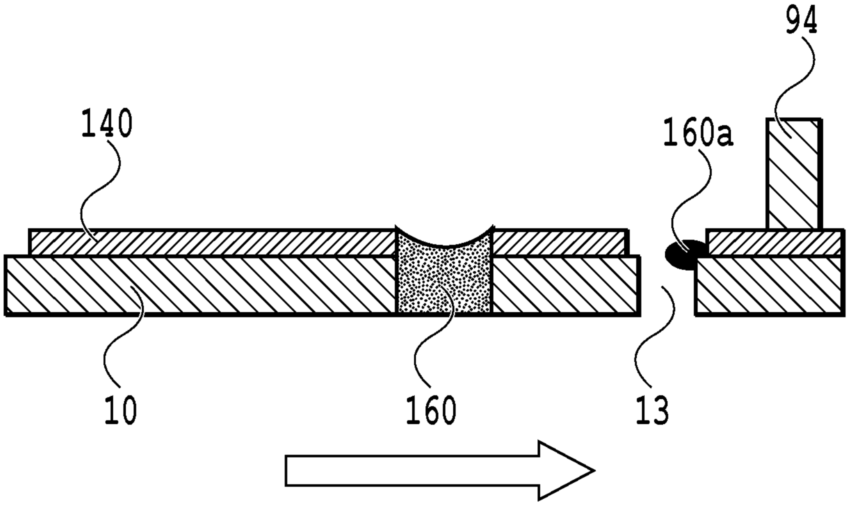

Next, the water-repellent portion of the protection member 140 in the present disclosure is explained. FIG. 17A is a perspective diagram of the protection member 140 in the present embodiment, FIG. 17B is a top diagram of the protection member 140 according to the present embodiment, and FIG. 17C is a top diagram in a case where the liquid ejection head 3 to which the protection member 140 according to the present embodiment is bonded is viewed from the ejection port side. Further, FIG. 18 is a top diagram in a case where the liquid ejection head 3 is viewed from the ejection port side, the protection member 140 being provided with no water-repellent portion. FIG. 19A is a schematic cross-sectional diagram before the wiping operation is performed in a case where the sealing member 160 sticks to the surface on the ejection port side of the protection member 140. FIG. 19B is a schematic diagram after the wiping operation is performed in a case where the sealing member 160 sticks to the surface on the ejection port side of the protection member 140.

As shown in FIG. 17B and FIG. 17C, on the protection member 140, a water-repellent portion 140*a* is formed in the area in close proximity to the sealing member 160. For the sealing member 160, a material whose fluidity is high before hardening is used. Because of this, it is possible to seal various spaces with the sealing member 160.

On the other hand, in a case where the water-repellent portion 140*a* is not formed on the protection member 140, on a condition that the appropriate amount of the sealing member 160 or more flows into the space, there is a possibility that the sealing member 160 climbs up onto the protection member 140 and a sealing member climbed-up portion 160*a* having climbed up sticks to the surface of the protection member 140 (see FIG. 18). Further, as shown in FIG. 19A and FIG. 19B, in a case where the wiping operation is performed in the state where the sealing member climbed-up portion 160*a* sticks to the surface on the ejection port side of the protection member 140, the sealing member climbed-up portion 160*a* is scraped off by the wiping member 94. Due to his, there is a possibility that the scraped-off sealing member climbed-up portion 160*a* invades into the inside of the ejection port of the printing element substrates 10 causes non-ejection.

However, in the present disclosure, as shown in FIG. 17B and FIG. 17C, water-repellent treatment is performed for one side of the protection member 140, which is in close proximity to the sealing member 160, and the water-repellent portion 140*a* is formed. Due to this, the sealing member 160 is suppressed from climbing up onto the surface of the protection member 140. Due to the configuration such as this, even in a case where the wiping member 94 is caused to scan in the direction of the arrow in FIG. 19A and FIG. 19B, the sealing member 160 is not scraped off and it is possible to suppress the non-ejection of the printing element substrates 10. In the present embodiment, at one side of the four sides of the printing element substrates 10 viewed from the ejection port surface, along which the sealing portion 110 is provided, the protection member 140 and the sealing member 160 are not in close proximity to each other. Because of this, the water-repellent portion 140*a* is formed along only the three sides except for the side along which the sealing portion 110 is provided. It is preferable for the pure water small contact angle of the water-repellent portion 140*a* to be 600 or more so that a material whose fluidity is high can also be repelled. Due to this, it is possible to return the sealing member 160 having climbed up onto the water-repellent portion 140*a* into the space.

Further, as shown in FIG. 17B, the water-repellent portion 140*a* in the present disclosure is formed at only a part on the ejection port surface side of the sides along which the protection member 140 and the sealing member 160 are in close proximity to each other. The wiping member 94 performs the wiping operation while scanning in the direction in which the printing element substrates 10 are arrayed in the state of being in touch with the protection member 140, and therefore, the frictional force between the wiping member 94 and the protection member 140 becomes large. As a result of that, there is a possibility that the protection member 140 peels off from the ejection surface 120 due to the wiping operation.

Consequently, as in the present disclosure, by forming as less the water-repellent portion 140*a* as possible in the area in which the wiping member 94 of the protection member 140 scans in the state of being in touch with the protection member 140, the surface on the ejection surface side of the protection member 140 becomes the wet state with ink. As a result of that, it is possible to make small the frictional force between the wiping member 94 and the protection member 140, and therefore, it is possible to suppress the protection member 140 from peeling off from the ejection surface 120, which is caused by the wiping operation.

As described above, for the area of the protection member 140, which is in close proximity to the sealing member 160, the water-repellent treatment is performed. However, in a case where the water-repellent treatment is performed for the protection member 140, there is a possibility that the protection member 140 peels off from the ejection surface 120 at the time of the wiping operation. That is, the water-repellent treatment is not performed for the entire area of the protection member 140 but the water-repellent treatment is performed for the minimum area and the water-repellent portion 140*a* is formed on the protection member 140. The minimum area is the area in which the sealing member 160 is in close proximity to the protection member 140. The sealing portion 110 covers the wire bonding portion (electrical connection portion) with a sealing material and does not affect the wiping operation, and therefore, the water-repellent portion 140*a* is not formed thereon because there arises no problem even in that case.

(Description Relating to Water-Repellent Treatment Method of Protection Member)

Figure 20A:
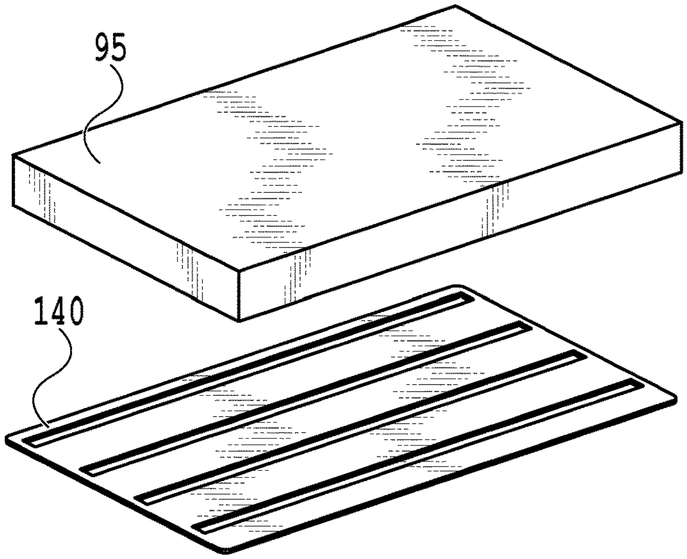
FIG. 20A to FIG. 20C are an exploded perspective diagram, a perspective diagram, and a diagram viewed from arrow viewpoint, respectively, at the time of processing to perform water-repellent treatment of the protection member in the first embodiment.
Figure 20B:
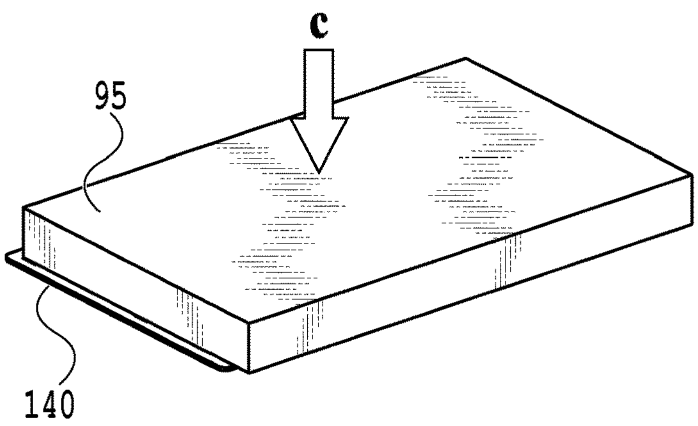
Figure 20C:
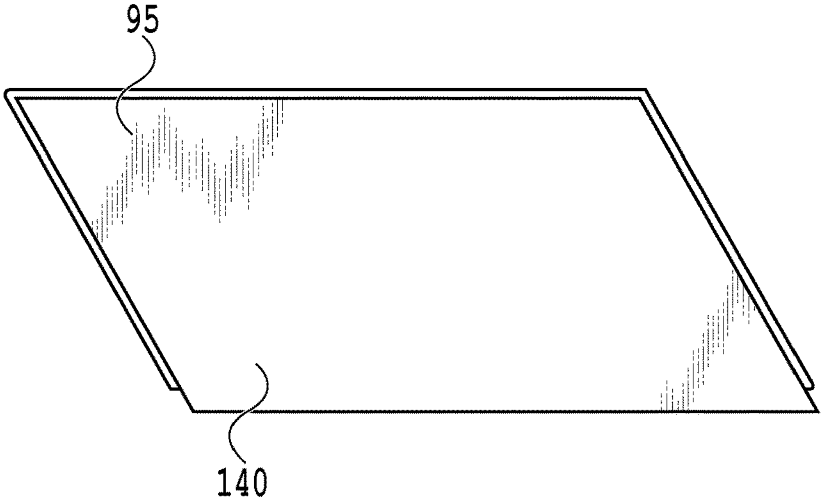

The water-repellent treatment method of the protection member 140 in the present embodiment is explained. FIG. 20A is an exploded perspective diagram at the time of the water-repellent treatment of the protection member 140, FIG. 20B is a perspective diagram at the time of the water-repellent treatment of the protection member 140, and FIG. 20C is a diagram viewed from arrow C viewpoint. As the water-repellent treatment method, a method by depositing treatment is widely known. The protection member 140 is bonded to the ejection surface 120 of the printing element substrate 10, and therefore, it is preferable for the protection member 140 to be thin. Due to this, the distance between the printing medium 2 and the printing element substrate 10 is reduced, and therefore, it is made easy to eject liquid to the printing medium.

However, in a case where the thickness of the protection member 140 is reduced, there is a possibility that a warp of the protection member 140 occurs. In a case where the water-repellent treatment by depositing is performed for the surface on the ejection port side of the protection member 140 in the state where there is a warp of the protection member 140, the gasified water repellent goes around and reaches the surface (protection member bonding surface) on the opposite side of the protection member 140 and the protection member bonding surface is also made water repellent. As a result of that, the protection member 140 and the printing element substrate 10 are not bonded sufficiently, and therefore, there is a possibility that the protection member 140 peels off from the ejection port formation member 12 due to the wiping operation and the like.

Consequently, in the present embodiment, as shown in FIG. 20B, the depositing treatment is performed while pressing down the protection member 140 with a hard mask 95 so that the protection member 140 does not warp. Due to this, it is possible to prevent the water repellent from going around and reaching the bonding surface side of the protection member 140 and suppress the bonding surface side of the protection member 140 from being subjected to the water-repellent treatment. Further, by performing the water-repellent treatment while covering a part on the ejection surface side of the protection member 140 with the hard mask 95, it is possible to perform the water-repellent treatment for only a part on the ejection surface side of the protection member 140. That is, it is possible to reduce the water-repellent area of the protection member 140 to a bare minimum. As a result of that, it is possible to make small the frictional force that is produced between the wiping member 94 and the protection member 140 and suppress the protection member 140 from peeling off from the ejection surface 120 due to the wiping operation.

Second Embodiment

A second embodiment of the present disclosure is explained. Description of the same function and configuration as those of the first embodiment of the present disclosure is omitted and different portions are explained.

Figure 21A:
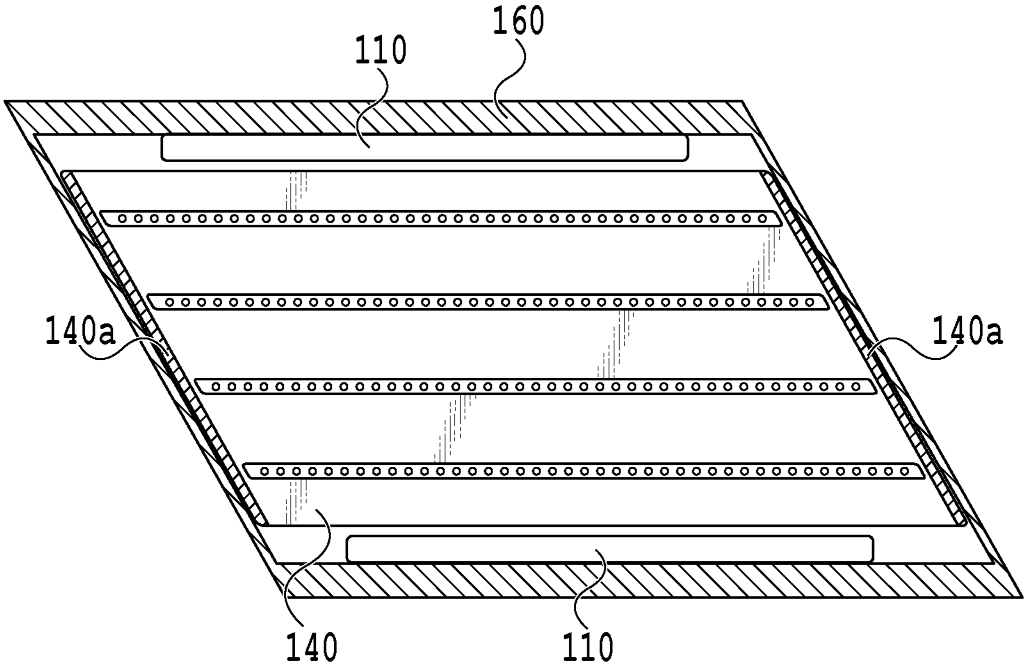
FIG. 21A and FIG. 21B are each a top diagram in a case where a liquid ejection head is viewed from an ejection port side in a second embodiment.
Figure 21B:
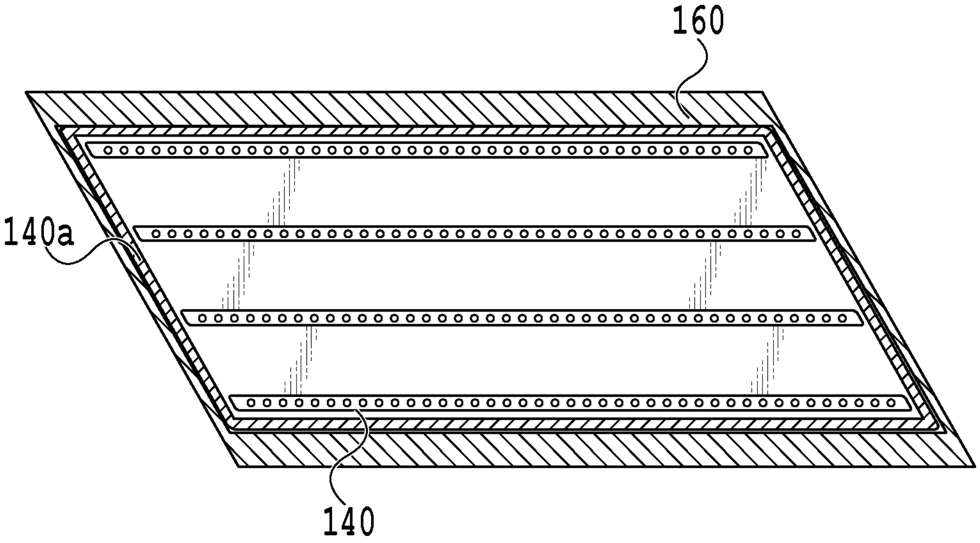

FIG. 21A and FIG. 21B are each one example of a top diagram schematically showing one printing element substrate viewed from the ejection port side of the protection member 140 in the second embodiment. In the first embodiment, the water-repellent portion 140*a* of the protection member 140 is provided only for the three sides except for the side of the sealing portion 110 of the four sides of the printing element substrate 10 viewed from the ejection port surface, but the present disclosure is not limited to this.

As shown in FIG. 21A, the two sealing portions 110 are formed so as to face the printing element substrate 10. Due to this, two sides are in close proximity to the sealing member 160, and therefore, the water-repellent portion 140*a* is provided only for two sides. Due to this, it is possible to suppress the sealing member 160 from climbing up and make small the frictional force that is produced between the wiping member 94 and the protection member 140, and therefore, it is possible to suppress the protection member 140 from peeling off from the ejection surface 120.

Further, as shown in FIG. 21B, there is a case where the sealing portion 110 is not formed on the ejection surface 120 of the printing element substrate 10. In this case, four sides are in close proximity to the sealing member 160, and therefore, the water-repellent portion 140*a* is also formed for the four sides. Due to the configuration such as this, even in a case where the wiping member 94 is caused to scan, it is made possible to suppress the non-ejection of the printing element substrate 10, which is caused by the sealing member 160 being scraped off.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211333, filed Dec. 28, 2022, which is hereby incorporated by reference wherein in its entirety.

What is claimed is:

1. A liquid ejection head comprising:

a first liquid ejection module and a second liquid ejection module, each comprising a printing element substrate having an ejection surface on which an ejection port row ejecting liquid is formed and a protection member having an opening corresponding to the ejection port row, wherein the ejection surface and the protection member are bonded to each other with a bonding adhesive, a space between the first liquid ejection module and the second liquid ejection module is sealed with a sealing member, and on a surface on an opposite side of a surface bonded to the ejection surface with the bonding adhesive, at least one side of the protection member, which is in close proximity to the sealing member, is made water repellent.

2. The liquid ejection head according to claim 1, wherein a contact angle of an area made water repellent in the protection member is 60° or more in a pure water small contact angle.

3. The liquid ejection head according to claim 1, wherein a width of the opening is greater than or equal to a diameter of an ejection port and a thickness of the protection member is less than or equal to a thickness of the printing element substrate.

4. The liquid ejection head according to claim 1, wherein a width of the opening is 200 μm or more and a thickness of the protection member is less than 50 μm.

5. The liquid ejection head according to claim 1, wherein the protection member is made of metal.

6. The liquid ejection head according to claim 5, wherein the protection member is stainless.

7. The liquid ejection head according to claim 6, wherein a clearance between the first liquid ejection module and the second liquid ejection module is 100 μm or less.

8. The liquid ejection head according to claim 1, wherein a viscosity of the sealing member before hardening is 15 Pa·s or less.

9. The liquid ejection head according to claim 1, further comprising:

a cover member, wherein the cover member has an opening and from the opening of the cover member, the printing element substrate is exposed.

10. The liquid ejection head according to claim 1, wherein the liquid ejection head is a line head corresponding to a width of a printing medium.

* * * * *